US008616658B2

(12) United States Patent
Morris

(10) Patent No.: US 8,616,658 B2
(45) Date of Patent: *Dec. 31, 2013

(54) WHEEL AND HUB ASSEMBLY

(71) Applicant: GEO Plastics, Los Angeles, CA (US)

(72) Inventor: Michael Abraham Morris, Rancho Palos Verdes, CA (US)

(73) Assignee: GEO Plastics, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,655

(22) Filed: Nov. 9, 2012

(65) Prior Publication Data

US 2013/0043715 A1 Feb. 21, 2013

Related U.S. Application Data

(63) Continuation of application No. 13/406,211, filed on Feb. 27, 2012, which is a continuation of application No. 11/944,322, filed on Nov. 21, 2007, now Pat. No. 8,147,005.

(51) Int. Cl.
*B60B 27/02* (2006.01)
*B60B 23/00* (2006.01)

(52) U.S. Cl.
USPC ..................................... 301/121; 301/111.04

(58) Field of Classification Search
USPC ............ 301/64.701–64.702, 111.01, 111.03, 301/112–114, 118–122; 403/378, 379.5
See application file for complete search history.

(56) References Cited

U.S. PATENT DOCUMENTS

| 353,218 | A | 11/1886 | Harrington |
| 1,553,054 | A | 9/1925 | Vial et al. |
| 2,117,947 | A | 5/1938 | De Rome et al. |
| 2,588,901 | A | 3/1952 | Weikart |
| D221,833 | S | 9/1971 | Haydock |
| 4,392,690 | A | 7/1983 | Anderson |

(Continued)

FOREIGN PATENT DOCUMENTS

| CN | 1304363 | 7/2001 |
| DE | 3312590 A1 | 10/1984 |

(Continued)

OTHER PUBLICATIONS

International Search Report and Written Opinion for PCT Application No. PCT/US2008/082518, dated Jun. 12, 2009.

(Continued)

*Primary Examiner* — Jason Bellinger
(74) *Attorney, Agent, or Firm* — Knobbe Martens Olson & Bear, LLP

(57) ABSTRACT

A hub assembly includes a retainer housing, a retaining member, a biasing element, and an occlusion. The retainer housing includes a wheel mounting sleeve and a pin sleeve. The wheel mounting sleeve includes an axle bore configured to receive an axle. The pin sleeve has a first end and a second end. The pin sleeve includes a conduit between the first end and the second end. The first end is in fluid communication with the axle bore. The retaining member and the biasing element are in the conduit. The retaining member is configured to engage a groove in an axle. The biasing element is configured to bias the retaining member towards the axle bore. The occlusion is proximate to the second end of the pin sleeve. The occlusion is configured to inhibit the retaining member from exiting the conduit at least prior to coupling the hub assembly to a wheel.

18 Claims, 23 Drawing Sheets

(56) References Cited

U.S. PATENT DOCUMENTS

| | | |
|---|---|---|
| 4,392,759 A | 7/1983 | Cook |
| 4,452,420 A | 6/1984 | Lundquist |
| 4,692,049 A | 9/1987 | Engle |
| 5,029,946 A | 7/1991 | Liao |
| D327,048 S | 6/1992 | Markling et al. |
| D328,053 S | 7/1992 | Markling |
| 5,215,356 A | 6/1993 | Lin |
| 5,326,186 A | 7/1994 | Nyberg |
| D352,687 S | 11/1994 | Markling |
| 5,476,275 A | 12/1995 | Baechler et al. |
| 5,507,566 A | 4/1996 | Chen |
| 5,716,107 A | 2/1998 | Parker et al. |
| 6,024,416 A | 2/2000 | Chen et al. |
| 6,170,920 B1 | 1/2001 | Markling |
| D444,283 S | 6/2001 | Konkle |
| 6,273,520 B1 | 8/2001 | Liao |
| 6,276,759 B1 | 8/2001 | Lan |
| 6,349,994 B1 | 2/2002 | Chapman |
| 6,361,121 B1 | 3/2002 | Morris |
| 6,375,274 B1 | 4/2002 | Morris |
| 6,464,305 B2 | 10/2002 | Markling |
| 6,520,597 B1 | 2/2003 | Markling |
| 6,523,910 B1 | 2/2003 | Lin |
| 6,637,835 B2 | 10/2003 | Morris |
| 6,666,526 B1 | 12/2003 | Cummins |
| 6,722,744 B1 | 4/2004 | Shieh |
| 6,886,893 B1 | 5/2005 | Fisch et al. |
| 6,896,335 B2 | 5/2005 | Markling |
| 6,910,742 B2 | 6/2005 | Flood et al. |
| 6,913,324 B2 | 7/2005 | Markling |
| 6,938,964 B2 | 9/2005 | Flood et al. |
| 7,070,246 B2 | 7/2006 | Chen |
| 7,108,335 B2 | 9/2006 | Morris |
| D542,003 S | 5/2007 | Morris |
| D570,070 S | 5/2008 | Morris |
| 7,377,597 B2 | 5/2008 | Morris |
| 7,434,892 B2 | 10/2008 | Mercat et al. |
| 7,481,498 B1 | 1/2009 | Morris |
| D586,071 S | 2/2009 | Morris |
| D586,072 S | 2/2009 | Morris |
| 7,571,966 B2 | 8/2009 | Chen et al. |
| 7,591,592 B2 | 9/2009 | Beirne et al. |
| D632,044 S | 2/2011 | Morris |
| D640,439 S | 6/2011 | Morris |
| 8,002,363 B2 | 8/2011 | Cheng |
| 8,037,911 B2 | 10/2011 | Morris |
| 8,147,005 B2 | 4/2012 | Morris |
| 2001/0001222 A1 | 5/2001 | Markling |
| 2003/0085611 A1 | 5/2003 | Markling |
| 2003/0197423 A1 | 10/2003 | Liao |
| 2004/0070262 A1 | 4/2004 | Markling |
| 2006/0261669 A1 | 11/2006 | Dreyer |
| 2007/0164601 A1 | 7/2007 | Mercier et al. |
| 2008/0042487 A1 | 2/2008 | Chen et al. |
| 2012/0019052 A1 | 1/2012 | Morris |
| 2012/0049612 A1 | 3/2012 | Vogler et al. |
| 2012/0074663 A1 | 3/2012 | Parker et al. |
| 2012/0153586 A1 | 6/2012 | Morris |

FOREIGN PATENT DOCUMENTS

| | | |
|---|---|---|
| DE | 8507012 U1 | 5/1985 |
| DE | 8628385 U1 | 12/1986 |
| DE | 8704624 U1 | 5/1987 |
| DE | 8712211 U1 | 11/1987 |
| DE | 4411096 | 11/1994 |
| EP | 0 508 902 | 10/1992 |
| EP | 0 726 172 A1 | 8/1996 |
| EP | 0 808 729 A1 | 11/1997 |
| EP | 1 477 331 A1 | 11/2004 |
| EP | 2 327 569 A1 | 6/2011 |
| FR | 2 808 243 A1 | 11/2001 |
| WO | WO 99/62728 | 12/1999 |

OTHER PUBLICATIONS

International Preliminary Report on Patentability and Written Opinion of the International Searching Authority for International Application No. PCT/US2008/082518, issued on May 25, 2010, mailed on Jun. 3, 2010, in 6 pages.
Office Action issued in Chinese Patent Application No. 200880117583.9 on Dec. 21, 2011.
Extended European Search Report for European Application No. 08152895.2, dated Aug. 18, 2008.
Office Action issued in European Application No. 08152895.2, dated Apr. 19, 2011, in 4 pages.
Intent to Grant issued is EP Application No. 08152895.2, dated Aug. 22, 2012.
Office Action issued in Chinese Application No. 200880117583.9, dated Oct. 10, 2012.
Patent Examination Report issued in AU Patent Application No. 2008329939, dated Dec. 24, 2012.
Intent to Grant issued in European Application No. 08 152 895.2, dated Jan. 17, 2013.
Notice of Acceptance issued in Australian Application No. 2008329939, dated Jan. 18, 2013.
Notification to Grant Patent Right issued in Chinese Application No. 200880117583.9, dated Mar. 29, 2013.
Office Action issued in Mexican Application No. MX/a/2010/005583, dated Mar. 8, 2013.
Notice of Allowance issued in Mexican Application No. MX/a/2010/005583, dated Jun. 28, 2013.

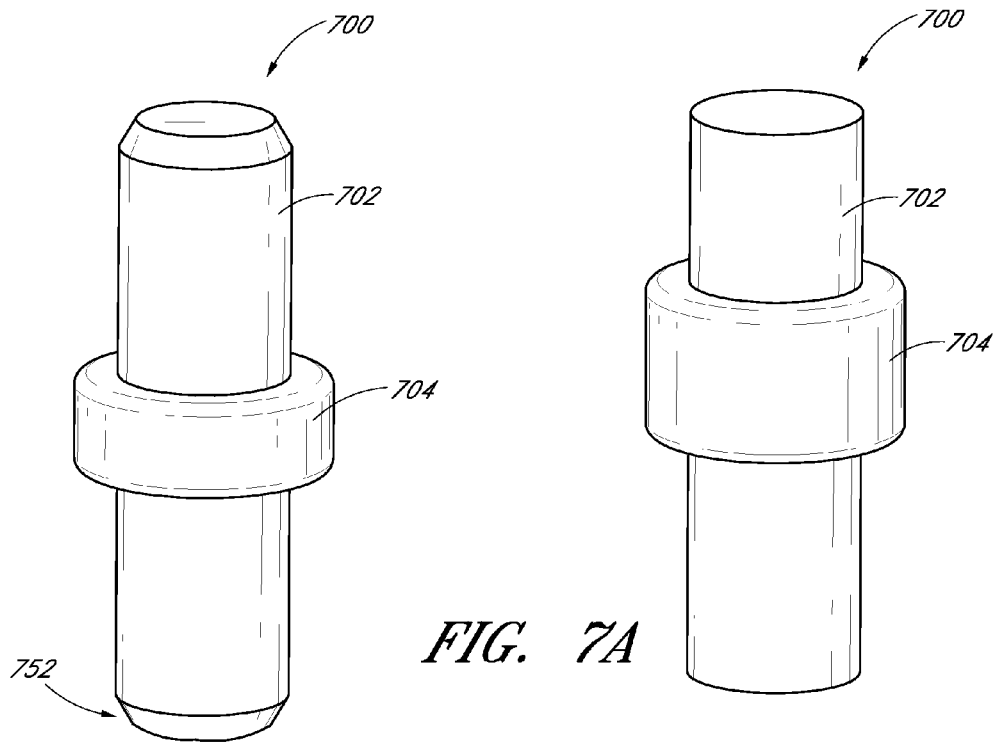
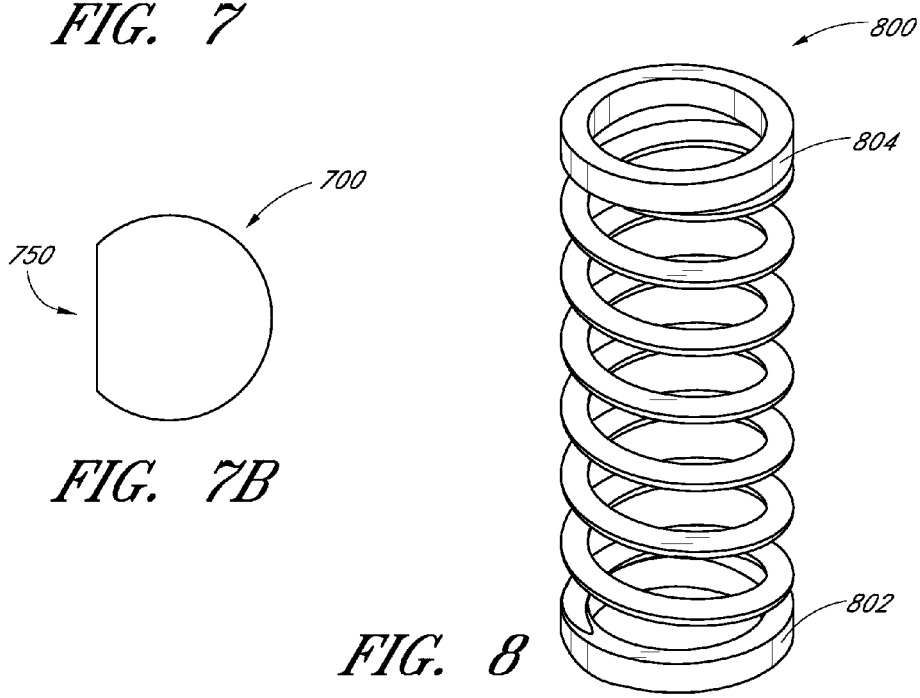

WHEEL AND HUB ASSEMBLY

CROSS-REFERENCE TO RELATED APPLICATIONS

The present application is a continuation of U.S. patent application Ser. No. 13/406,211, filed on Feb. 27, 2012, which is a continuation of U.S. patent application Ser. No. 11/944,322, filed on Nov. 21, 2007 and issued as U.S. Pat. No. 8,147,005 on Apr. 3, 2012, each of which is incorporated herein by reference in its entirety.

BACKGROUND

1. Field

The present invention generally relates to wheel assemblies and the manner of their mounting to and removal from an axle, and more particularly, to wheel and hub assemblies used on refuse carts and the like.

2. Description of the Related Art

The use of plastic wheels on a variety of products has dramatically increased in recent years. One area where such plastic wheels have been widely employed is on wheeled refuse or garbage carts or bins of the type commonly employed by homeowners for their trash. These carts traditionally have plastic wheels that are mounted on the ends of a metal axle by a hub member or push-on hat fastener (sometimes referred to as "pawl nut"). The wheel hub is hammered onto the end of the axle to hold the wheel in place. Removal of such plastic wheels in order to replace or repair the wheel or the cart can be difficult because the hammered push-on hat fasteners or hubs require special tools for their removal, or essentially must be destroyed to remove them from the axle. Sometimes this process also damages the axles. Wheel-mounting sleeve assemblies have been devised which snap-on to a pre-machined axle to hold the wheel to the axle. However, these snap-on wheel assemblies have been unduly complex, visually unappealing, and poorly suited to the shock loading and vibration commonly encountered.

SUMMARY

The design of certain prior wheel and hub assemblies limits the extent of automatic assembly of a wheel and hub assembly because the pin and spring would be expelled from the wheel assembly without a portion of the wheel to keep them in place. The hub assembly may be specifically oriented such that the pin and spring do not fall out until coupling to a wheel. However, manipulation of the hub assembly such as transporting, dropping, turning, and especially vibration caused by automating equipment can cause the pin and spring to become lost before assembly, increasing costs and slowing assembly due to insertion of replacement parts. Additionally, foreign debris can enter the open end of a pin sleeve all the way until assembly with a wheel. Thus, the pin and spring are generally installed during coupling of the wheel and a hub assembly. Upon disengagement of the wheel from such hub assemblies, which may occur when a wheel assembly is broken (e.g., due to splitting of the wheel from shock loading), the pin and spring can be expelled from the hub assembly to be lost or damaged.

At least one aspect of the present invention is the realization of the advantages gained from a restraining element such as a plug that prevents the pin and spring from being separated from the hub assembly upon manipulation without being coupled to a wheel. Once the plug is coupled to the pin sleeve after the pin and spring are inserted therein, the hub assembly can be fully manipulated without causing separation of the components because the plug prevents the pin and spring from coming out of the pin sleeve. The hub assembly can thus be formed well before it is coupled to the wheel, allowing resources to be allocated without regard to the quantity of any component (i.e., more hub assemblies can be made even if there are no wheels to couple them to because they can be stored without the fear of losing pieces). The plug also allows fully automated assembly because the hub assembly can be oriented in any direction and can be positioned by a vibratory feeder. Moreover, if a wheel is damaged, the hub assembly, which is typically the more expensive component, can be coupled to another wheel because all of its pieces are still in tact and accounted for.

In certain embodiments, a wheel assembly comprises a wheel and a hub assembly mounted in the wheel. The wheel includes a sleeve bore. The hub assembly includes a retainer housing, a retaining member, a biasing element, and a restraining element. The retainer housing includes a wheel mounting sleeve and a pin sleeve. The wheel mounting sleeve includes an axle bore configured to receive an axle and configured to be inserted within the sleeve bore of the wheel. The pin sleeve includes a first end, a second end, and a conduit between the first end and the second end. The first end is in fluid communication with the axle bore. The first end includes a shoulder extending into the conduit. The retaining member is disposed within the conduit of the pin sleeve. The retaining member includes a lip wider than the shoulder. The lip and the shoulder interact to prevent the retaining member from exiting the first end of the pin sleeve. The biasing element is disposed within the conduit of the pin sleeve and is configured to bias the retaining member towards the axle bore. The retaining member is configured to operatively engage a groove in an axle. The restraining element is configured to prevent the retaining member from exiting the second end of the pin sleeve.

In certain embodiments, a hub assembly comprises a retainer housing, a retaining member, a biasing element, and a restraining element. The retainer housing includes a wheel mounting sleeve and a pin sleeve. The wheel mounting sleeve includes an axle bore configured to receive an axle and configured to be inserted within a sleeve bore of a wheel. The pin sleeve includes a first end, a second end, and a conduit between the first end and the second end. The first end is in fluid communication with the axle bore. The first end includes a shoulder extending into the conduit. The retaining member is disposed within the conduit of the pin sleeve. The retaining member includes a lip wider than the shoulder. The lip and the shoulder interact to prevent the retaining member from exiting the first end of the pin sleeve. The biasing element is disposed within the conduit of the pin sleeve and is configured to bias the retaining member towards the axle bore. The retaining member is configured to operatively engage a groove in an axle. The restraining element is configured to prevent the retaining member from exiting the second end of the pin sleeve.

In certain embodiments, a method of manufacturing a wheel assembly comprises forming a wheel and forming a retainer housing. The wheel includes a sleeve bore. Forming the retainer housing includes forming a wheel mounting sleeve and forming a pin sleeve. The wheel mounting sleeve includes an axle bore configured to receive an axle and configured to be inserted within the sleeve bore of the wheel. The pin sleeve includes a first end, a second end, and a conduit between the first end and the second end. The first end is in fluid communication with the axle bore. The first end includes a shoulder extending into the conduit. The method further comprises positioning a retaining member within the pin sleeve. The retaining member includes a lip wider than the shoulder. The lip and the shoulder interact to prevent the retaining member from exiting the first end of the pin sleeve. The method further comprises positioning a biasing element in the pin sleeve to bias the retaining member towards the axle bore. The method further comprises occluding the second end of the pin sleeve, thereby preventing the retaining member from exiting the second end of the pin sleeve. The method further comprises inserting the wheel mounting sleeve of the retainer housing into the sleeve bore of the wheel, thereby coupling the retainer housing to the wheel.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects, and advantages of the invention disclosed herein are described below with reference to the drawings of preferred embodiments, which are intended to illustrate and not to limit the invention.

FIG. 7 is a top perspective view of an example embodiment of a retaining member.

FIG. 7A is a top perspective view of another example embodiment of a retaining member.

FIG. 7B is a top plan view of another example embodiment of a retaining member.

FIG. 8 is a top perspective view of an example embodiment of a biasing element.

DETAILED DESCRIPTION

Although certain preferred embodiments and examples are disclosed below, it will be understood by those in the art that the invention extends beyond the specifically disclosed embodiments and/or uses of the invention and obvious modifications and equivalents thereof. Thus, it is intended that the scope of the invention herein disclosed should not be limited by the particular disclosed embodiments described below.

Figure 1:
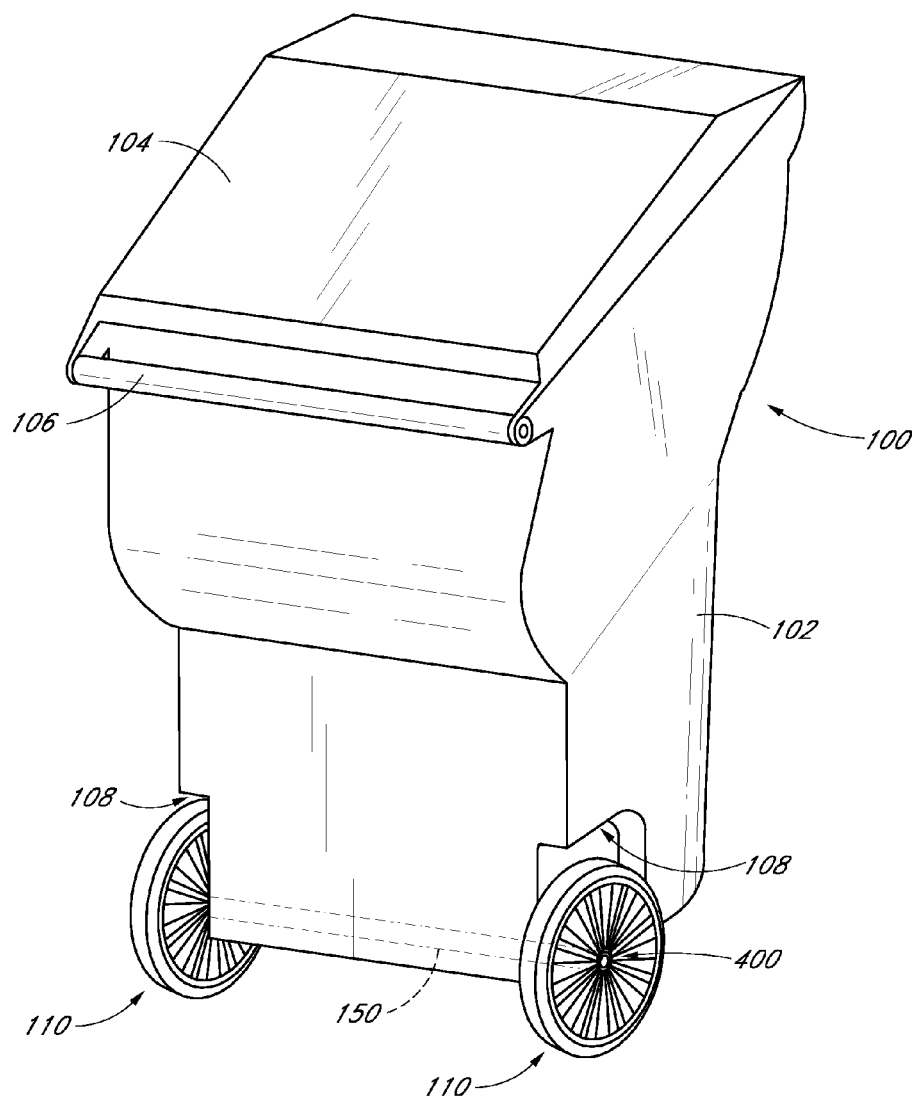
FIG. 1 is a top perspective view of a refuse cart including a wheel assembly mounted thereto.

The wheel assemblies described herein can be used in connection with numerous wheeled devices. FIG. 1 illustrates an example embodiment of a refuse cart comprising plurality of wheel assemblies 110 mounted on an axle 150 to the lower end of the cart body 102. A hinged lid 104 optionally can be provided, and the cart 100 can be tilted or tipped about the wheel assemblies 200 using handle 106 so as to enable rolling of the cart 100 for the transport of refuse, for example between a location for filling the cart 100 and a location for pickup by a refuse disposal company. The lower end of the cart body 102 optionally includes a wheel well or recess area 108 configured to receive wheel assemblies 110, for example to protect the wheel assemblies 110 and as a cosmetic structure. As described in detail below, the wheel assemblies 110 are secured on the axle 150 by a hub assembly 400. The wheel assemblies described herein are also suitable for use with other wheeled products such as wagons, wheeled food and beverage coolers, barbecues, wheeled toys, small refuse containers, and the like.

Figure 2A:
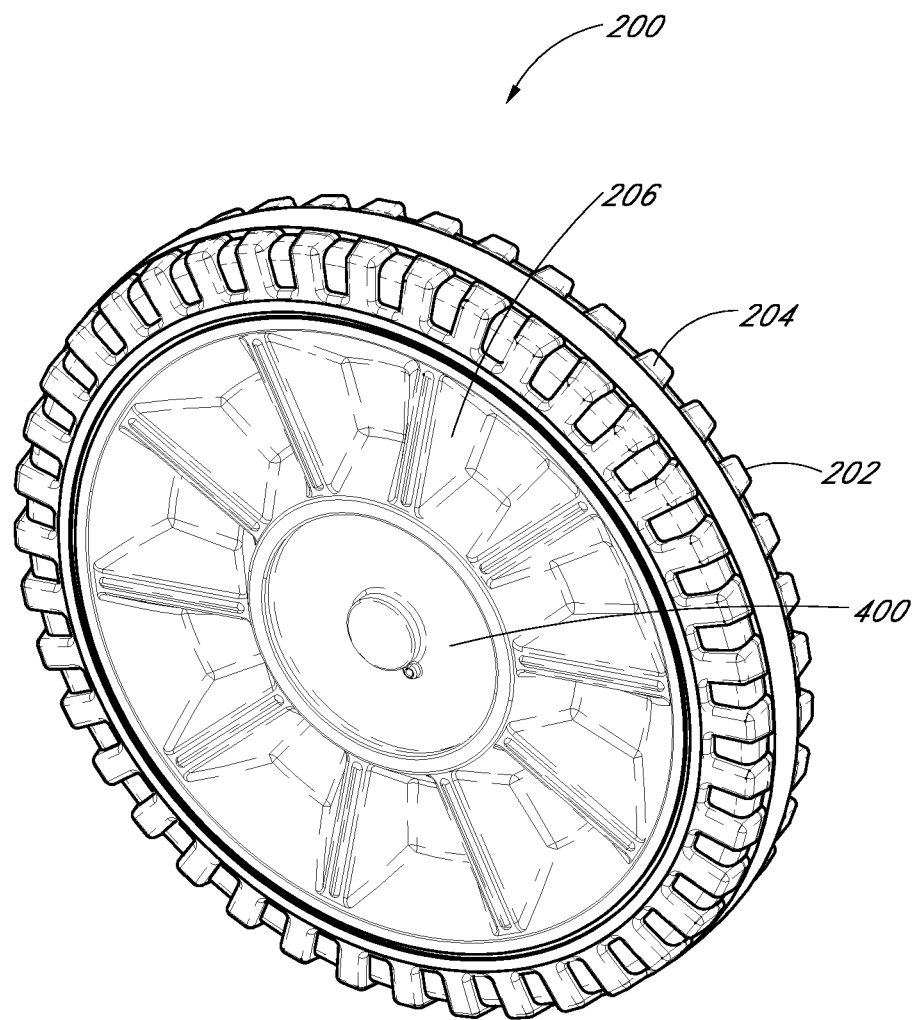
FIG. 2A is a top perspective view of a side of an example embodiment of a wheel assembly.
Figure 2B:
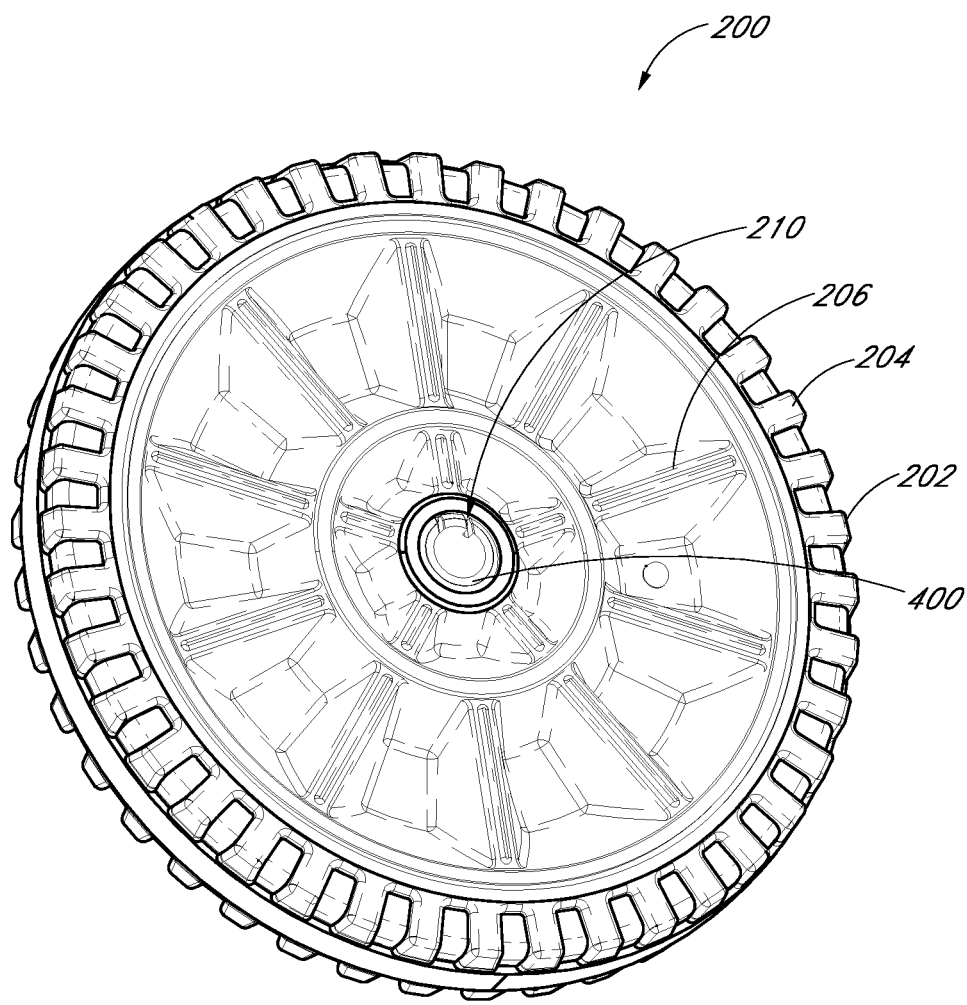
FIG. 2B is a bottom perspective view of another side of the wheel assembly of FIG. 2A.

FIG. 2A is a top perspective view of a side of an example embodiment of a wheel assembly 200 (e.g., an "outer" side when the wheel assembly is mounted to a cart 100 via an axle 150). FIG. 2B is a bottom perspective view of another side of the wheel assembly 200 of FIG. 2A (e.g., an "inner" side when the wheel assembly is mounted to a cart 100 via an axle 150). When viewing a cart 100 comprising a wheel assembly 200, a user can generally see the entire outer side of the wheel assembly 200, but a portion of the inner side of the wheel assembly 200 can be at least partially obscured by the lower end of the cart body 102 (e.g., as depicted in FIG. 1). The wheel assembly 200 comprises a wheel 202 and a hub assembly 400 (described below) coupled to (e.g., mounted on) the wheel 202.

Figure 5A:
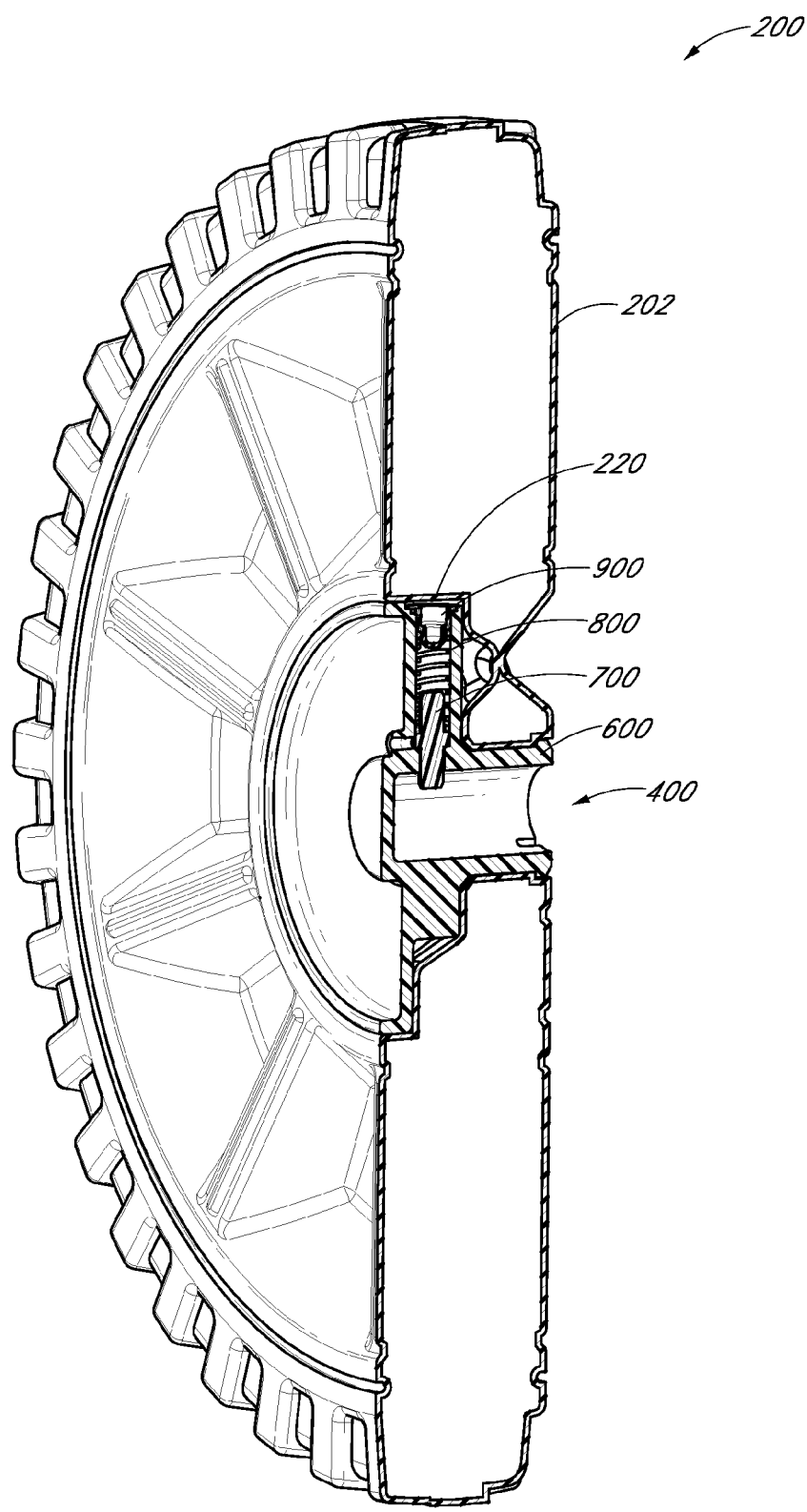
FIG. 5A is a cutaway top perspective view of the wheel assembly of FIG. 2A.

The wheel 202 illustrated in FIGS. 2A and 2B is blow molded. In certain embodiments, blow molding includes coupling two female mold cavities, extruding molten material (called a "parison"), and expanding the material by blowing air into the parison. After the material has sufficiently hardened, the wheel 202 is removed from the molds. In certain embodiments, treads 204 and spokes 206 are integrally formed during the molding process. The treads 204 can help the wheel 202 to frictionally engage a surface during rolling movement and can enhance the appearance of the wheel 202. The spokes 206 can help evenly distribute forces acting on the wheel 202. Other features of the wheel 202 may also be integrally formed by modifying the mold. The blow molding process forms hollow interior surfaces (see FIG. 5A) that can reduce the amount of material used in creation of the wheel 202, but also provide strength by creating certain shapes. In some embodiments, forming the wheel 202 includes trimming or "deflashing" the wheel 202. In certain such embodiments, the wheel 202 is deflashed while in a mold cavity. In certain embodiments, the wheel 202 comprises plastic (e.g., high density polyethylene (HDPE) (e.g., high molecular weight HDPE)).

Figure 3A:
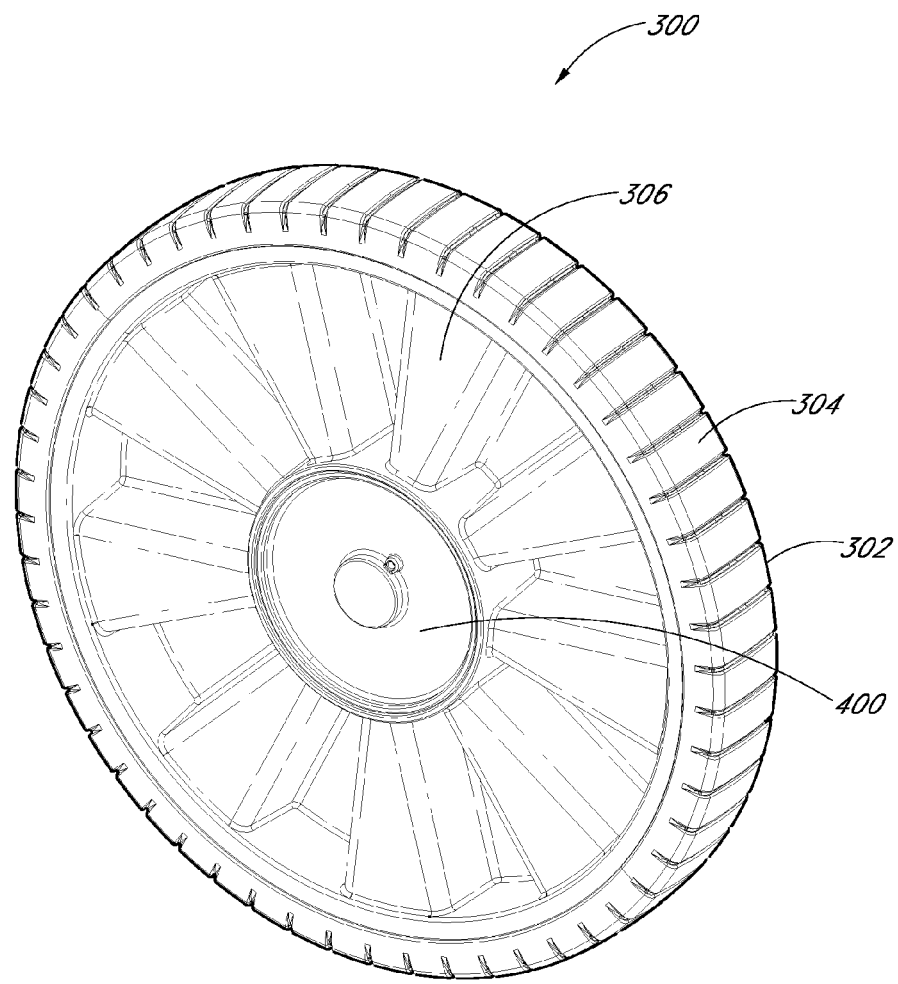
FIG. 3A is a top perspective view of a side of another example embodiment of a wheel assembly.
Figure 3B:
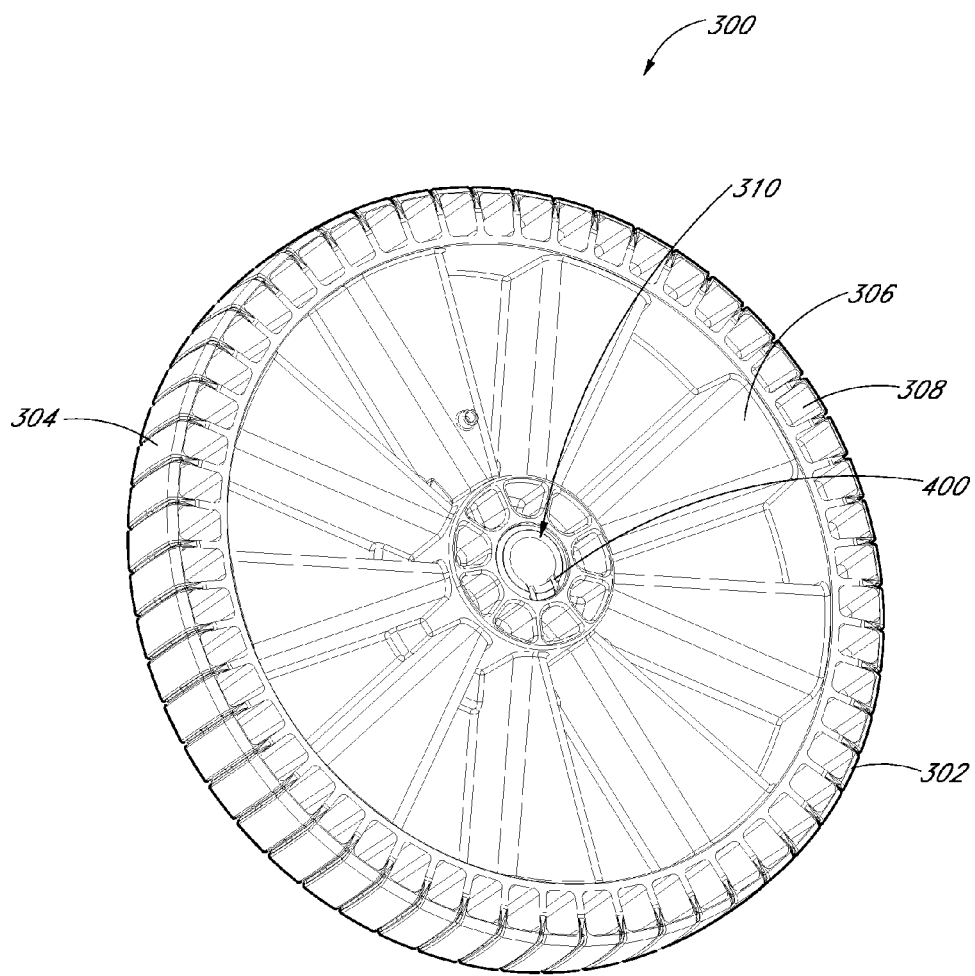
FIG. 3B is a bottom perspective view of another side of the wheel assembly of FIG. 3A.

FIG. 3A is a top perspective view of a side of another example embodiment of a wheel assembly 300 (e.g., an "outer" side when the wheel assembly is mounted to a cart 100 via an axle 150). FIG. 3B is a bottom perspective view of another side of the wheel assembly 300 of FIG. 3A (e.g., an "inner" side when the wheel assembly is mounted to a cart 100 via an axle 150). When viewing a cart 100 comprising a wheel assembly 300, a user can generally see the entire outer side of the wheel assembly 300, but a portion of the inner side of the wheel assembly 300 can be at least partially obscured by the lower end of the cart body 102 (e.g., as depicted in FIG. 1). The wheel assembly 300 comprises a wheel 302 and a hub assembly 400 (described below) coupled to (e.g., mounted on) the wheel 302.

The wheel 302 illustrated in FIGS. 3A and 3B is injection molded. In certain embodiments, injection molding includes coupling a male mold and a female mold and injecting molten material therebetween. After the material has sufficiently hardened, the wheel 302 is removed from the molds. In certain embodiments, treads 304 and spokes 306 are integrally formed during the molding process. The treads 304 can help the wheel 302 to frictionally engage a surface during rolling movement and can enhance the appearance of the wheel 302. The spokes 306 can help evenly distribute forces acting on the wheel 302. Other features of the wheel 302 may also be integrally formed by modifying the mold. The injection molding process can form corrugated and hollow interior surfaces (see FIG. 3C) that can reduce the amount of material used in creation of the wheel 302, but also provide strength by creating certain shapes. In certain embodiments, the wheel 302 comprises plastic (e.g., high density polyethylene (HDPE) (e.g., high molecular weight HDPE)). FIG. 3B also shows that cavities 308 may be formed under the treads 304, and in some embodiments exposed (e.g., on the inner side of the wheel 302).

Figure 3C:
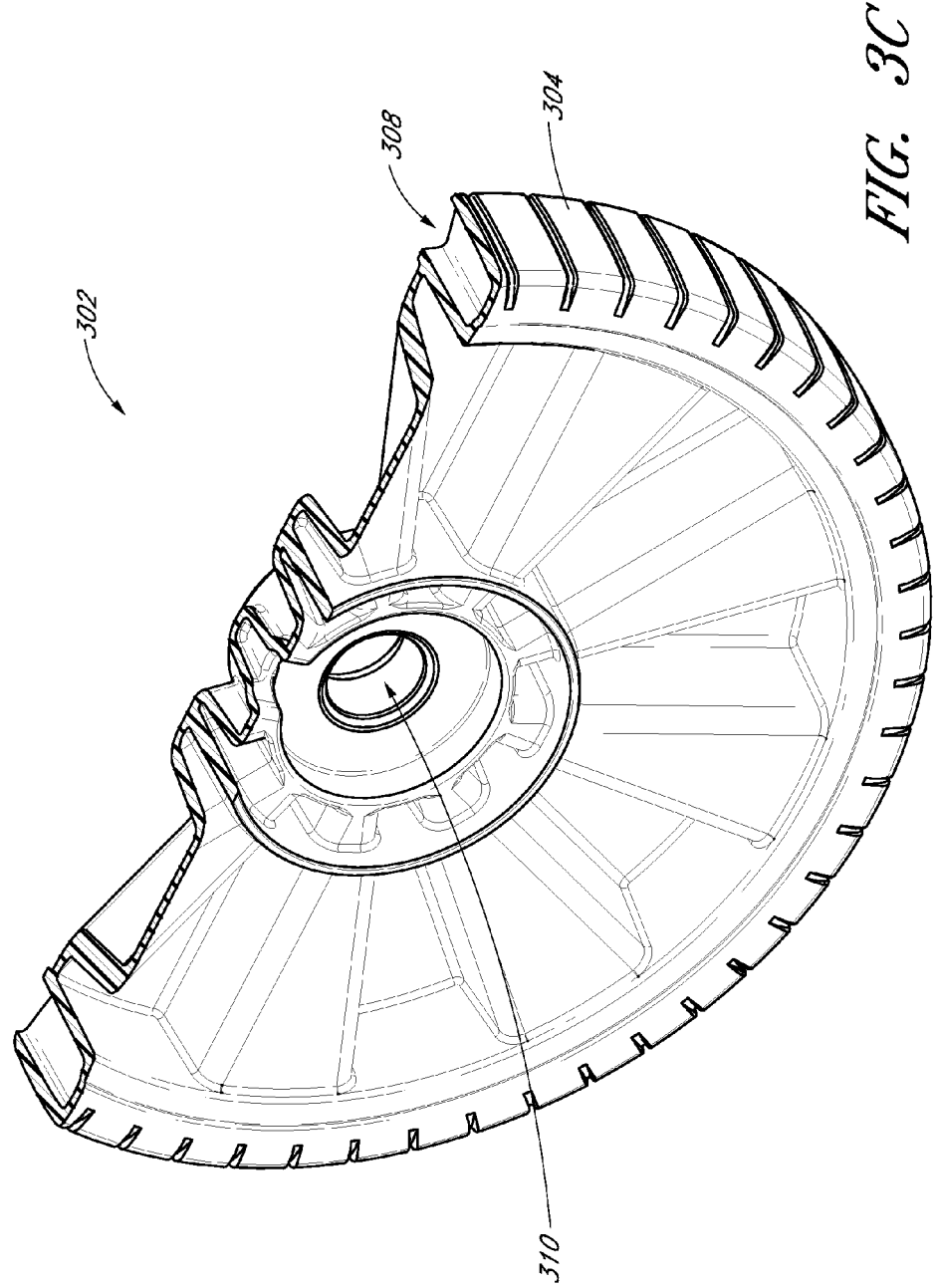
FIG. 3C is a top perspective cross sectional view of the wheel of the wheel assembly of FIG. 3A.

FIG. 3C illustrates a cross-sectional view of the wheel 302 of the wheel assembly 300. The wheel 302 includes a sleeve bore 310. In some embodiments, the sleeve bore 310 includes a first end, a second end, and a conduit therebetween. In certain embodiments, one of the ends may be closed. The sleeve bore 310 may be centered within the wheel 302 such that an axle 150 inserted into the sleeve bore 310 (e.g., into a hub assembly 400 at least partially disposed within the sleeve bore 310) can uniformly rotate. In certain embodiments, the sleeve bore 310 is configured to receive a wheel mounting sleeve of a hub assembly (e.g., the wheel mounting sleeve 302 of the hub assembly 400). Referring to FIG. 2B, the wheel 202 also includes a sleeve bore 210.

It will be appreciated that wheel assemblies described herein may comprise wheels manufactured using other processes (e.g., rotational or compression molding) and/or having other features. For example, the wheel may have a separate tread attached to the outer surface. For another example, the wheel may comprise materials such as wood, metal, rubber, combinations thereof, etc.

Figure 4A:
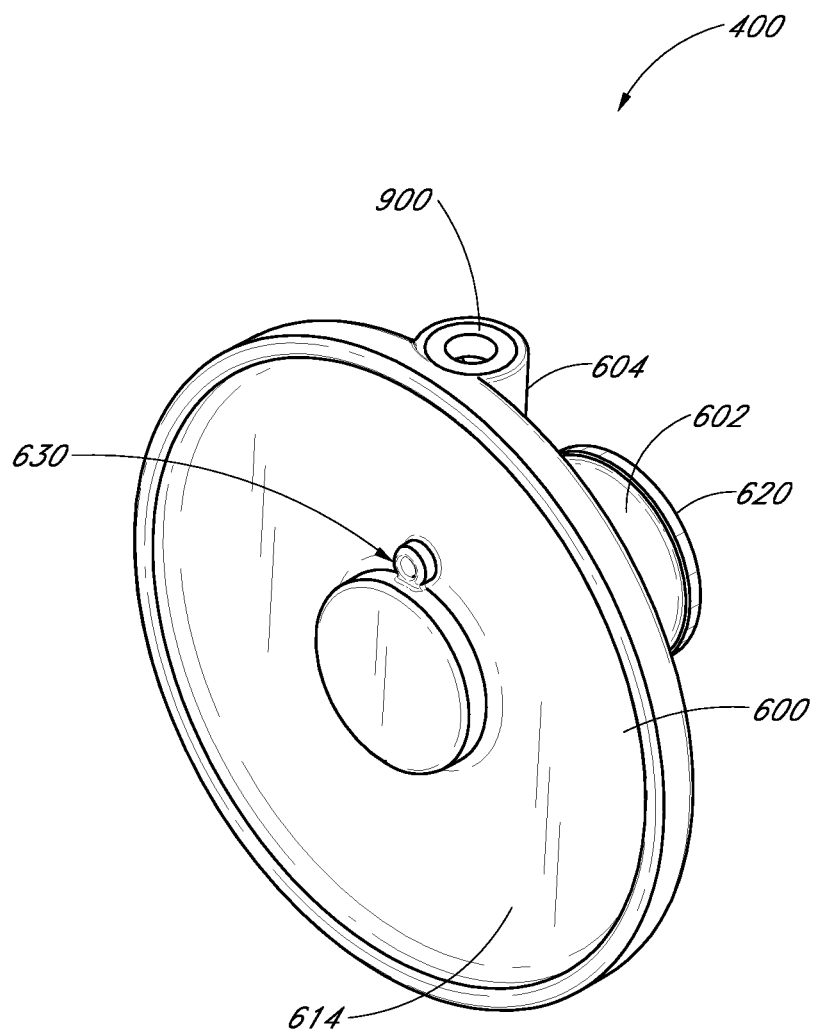
FIG. 4A is a top perspective view of a side of an example embodiment of a hub assembly.
Figure 4B:
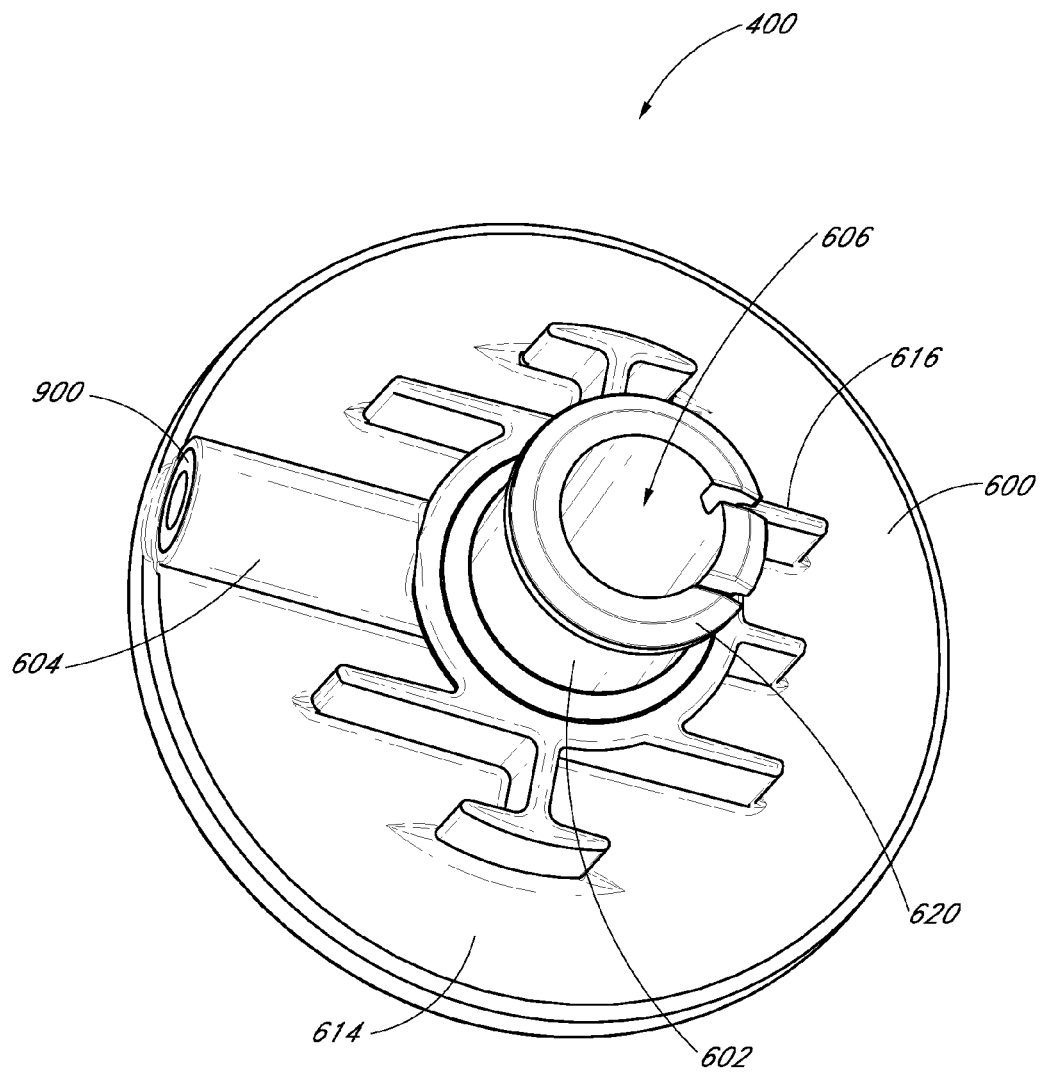
FIG. 4B is a bottom perspective view of another side of the hub assembly of FIG. 4A.
Figure 4C:
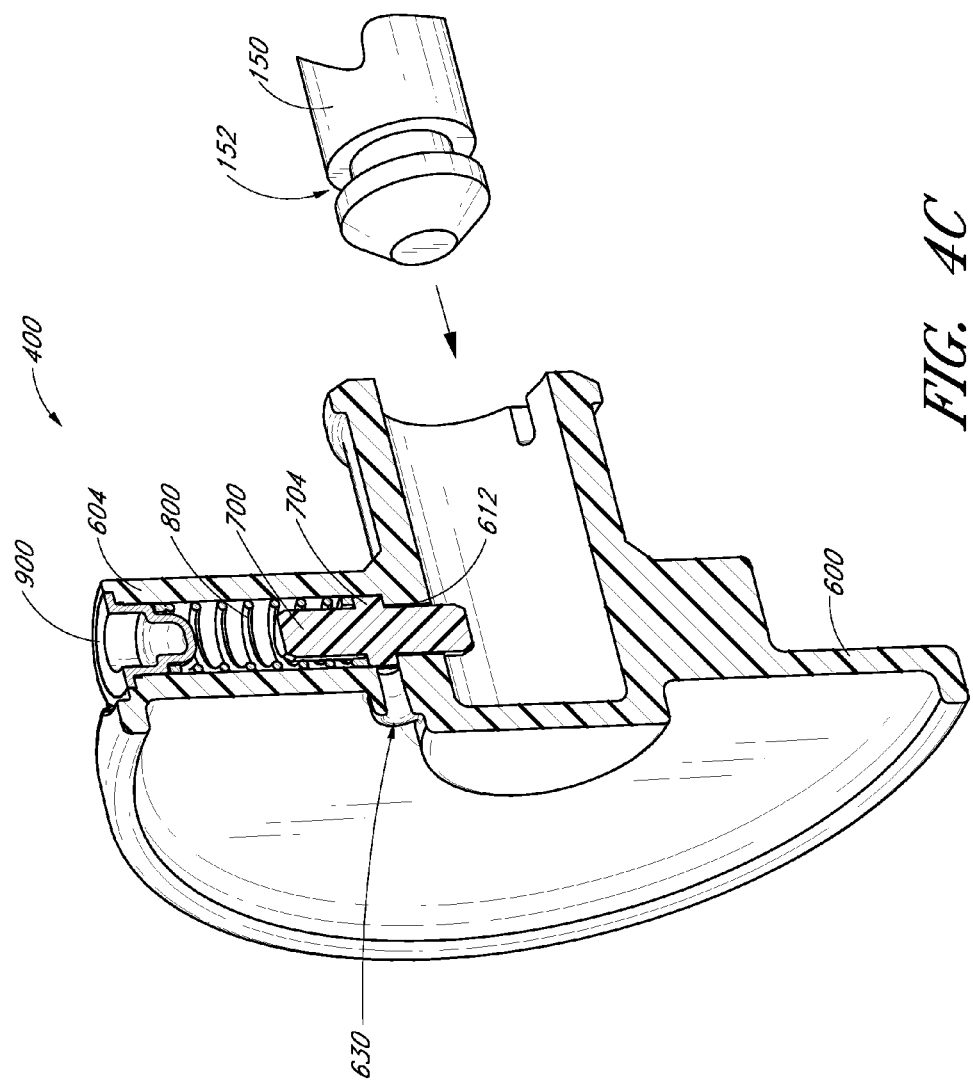
FIG. 4C is a cutaway top perspective view of the hub assembly of FIG. 4A.

FIG. 4A is a top perspective view of a side of an example embodiment of a hub assembly 400 (e.g., an "outer" side when the hub assembly 400 is mounted to a wheel that is mounted to a cart 100 via an axle 150). FIG. 4B is a bottom perspective view of another side of the hub assembly 400 of FIG. 4A (e.g., an "inner" side when the hub assembly 400 is mounted to a wheel that is mounted to a cart 100 via an axle 150). FIG. 4C is a cutaway top perspective view of the hub assembly 400 of FIG. 4A, which illustrates some of the inner components of the hub assembly 400.

Figure 6A:
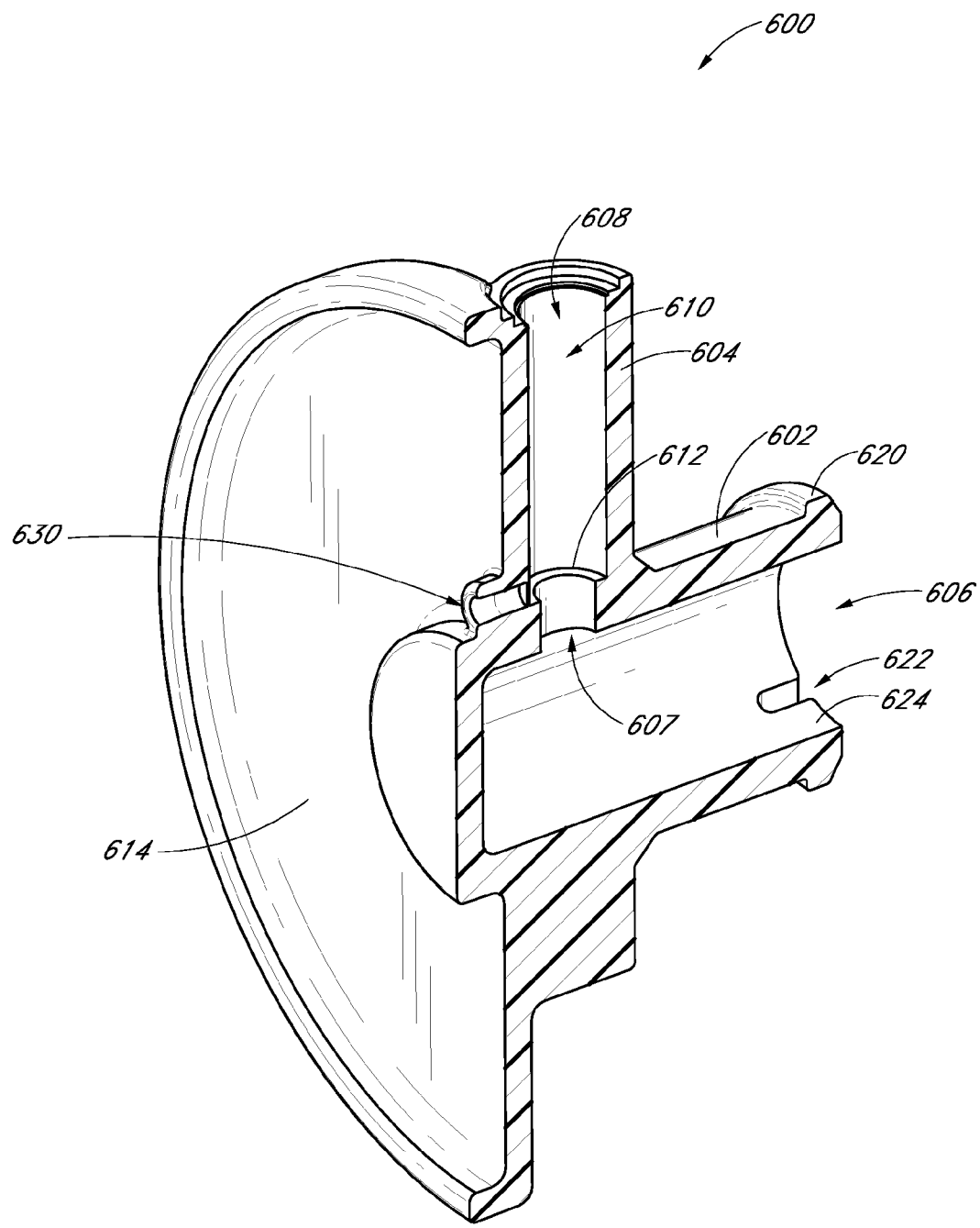
FIG. 6A is a cutaway top perspective view of a side of an example embodiment of a retainer housing.
Figure 6B:
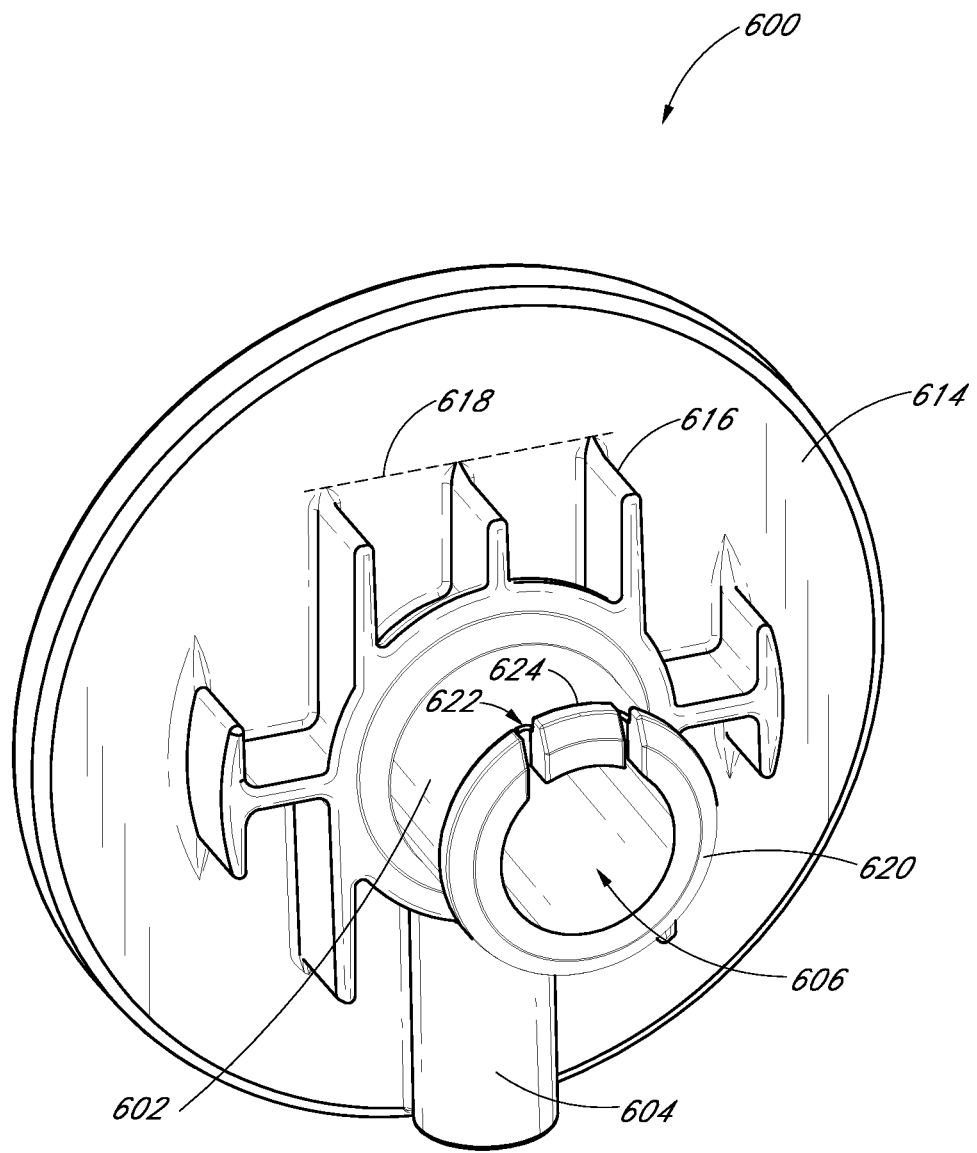
FIG. 6B is a top perspective view of another side of the retainer housing of FIG. 6A.

The hub assembly 400 comprises a retainer housing 600, a retaining member 700, a biasing element 800, and a restraining element 900. Each of the components of the hub assembly 400 is described in detail below. The retainer housing 600 includes a wheel mounting sleeve 602 including an axle bore 606 configured to receive an axle 150 and configured to be inserted within the sleeve bore 310 of a wheel 202, 302. The retainer housing 600 also includes a pin sleeve 604 including a first end 607, a second end 608, and a conduit 610 between the first end 607 and the second end 608 (FIGS. 6A and 6B). The first end 607 includes a shoulder 612 extending into the conduit 610. The retaining member 700 is disposed within the conduit 610 of the pin sleeve 604. The retaining member 700 includes a lip 704 that is wider than the shoulder 612. The lip 704 and the shoulder 612 interact to prevent the retaining member 700 from exiting the first end 607 of the pin sleeve 604. In hub assemblies without a lip 704 or a shoulder 612, the retaining member 700 may be pushed by the biasing element 800 into the axle bore 606, where it may become lost (e.g., by becoming displaced from the hub assembly) or damaged (e.g., by being crushed by the axle 150). The biasing element 800 is disposed within the conduit 610 of the pin sleeve 604. The biasing element 800 is configured to bias the retaining member 700 towards the axle bore 606 and is configured to operatively engage a groove 152 in an axle 150. The restraining element 900 is configured to prevent the retaining member 700 from exiting the second end 608 of the pin sleeve 604.

FIG. 4C is a cutaway top perspective view of the hub assembly 400, which shows the interaction between the elements. In some embodiments, the biasing element 800 within the pin sleeve 604 is in a relaxed position (i.e., the biasing element 800 only applies force to the retaining member 700 and the restraining element 900 upon being compressed). In certain embodiments, the biasing element 800 within the pin sleeve 604 is in a compressed state such that the biasing element 800 applies force to the retaining member 700 and the restraining element 900 regardless of the position of the retaining member 700. The restraining element 900 is stationary, but the retaining member 700 can move longitudinally within the pin sleeve 604 and compress the biasing element 800. A portion of the retaining member 700 protrudes through the first end 607 of the pin sleeve 604 and through the wheel mounting sleeve 602 and into the axle bore 606, where it can interact with a groove 152 in an axle 150. As an axle 150 is inserted into the axle bore 606, the axle 150 pushes the retaining member 700 into the pin sleeve 604. Once the axle 150 is extended until the groove 152 is aligned with the retaining member 700, the retaining member 700, acted upon by the biasing element 800, extends out of the pin sleeve 604 and into the groove 152.

Figure 4D:
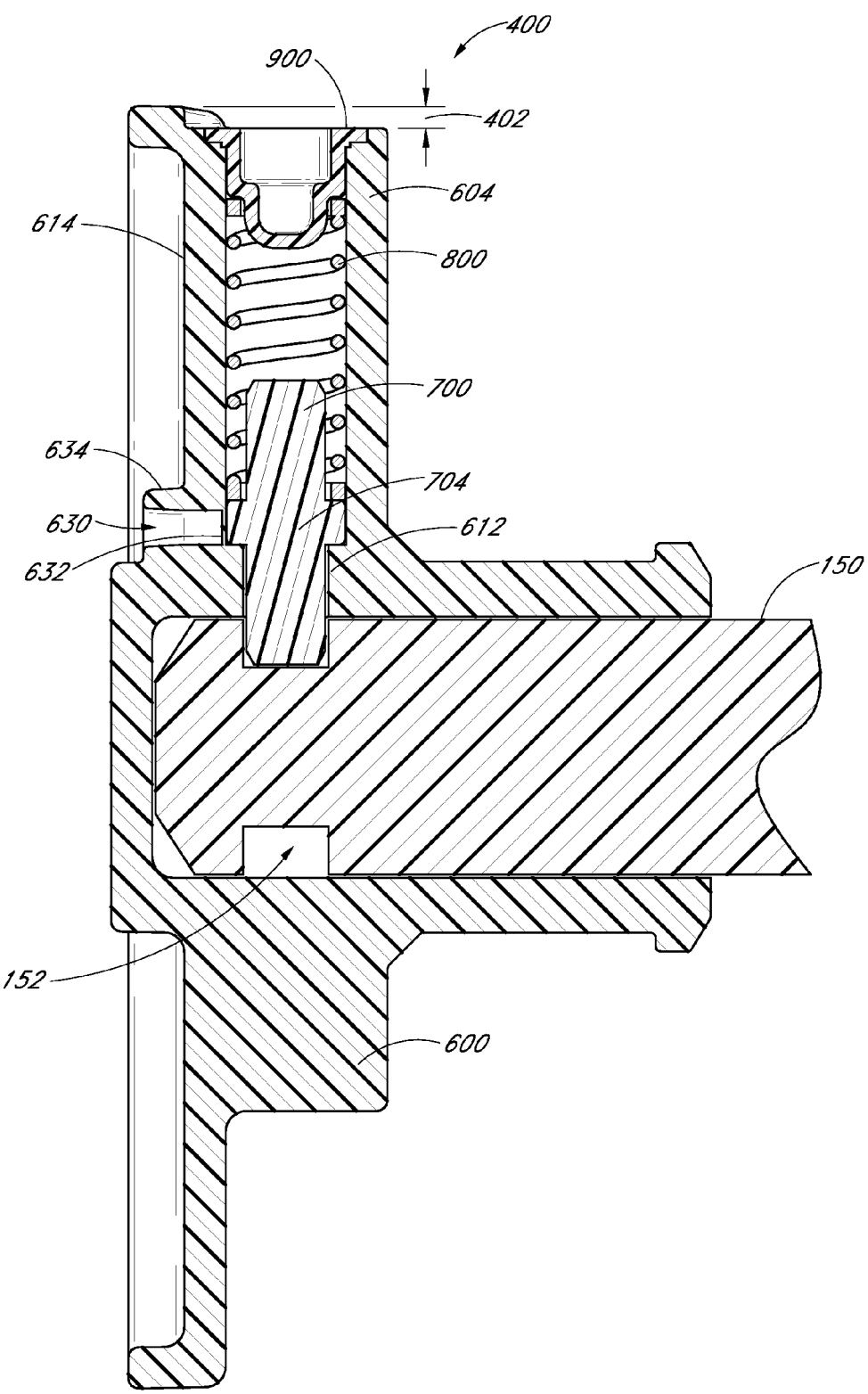
FIG. 4D is a cross-sectional view of the hub assembly of FIGS. 4A engaged with an axle.

FIG. 4D is a side cross-sectional view of the hub assembly 400 operatively engaged with the groove 152 of an axle 150. Once engaged, the retaining element 700 interacts with the groove 152 to prevent the hub assembly 400 from becoming detached from the axle 150. If a user wishes to detach the hub assembly 400 from the axle 150, a tool may be inserted into the tool passageway 630. A tool inserted through the tool passageway 630 may act on the retaining element 700 to extend it towards the second end 608 of the pin sleeve 604 and out of the axle bore 606, at which point the axle 150 may be slid out of the axle bore 606. In some embodiments, a tool may act on the lip 704 of the retaining element 700 (e.g., acting as a wedge or lever to cause the retaining element 700 to move). In some embodiments, a tool may pierce or puncture the retaining element 700 such that movement of the tool causes a corresponding movement of the retaining element 700. Other interactions between a tool and the retaining element 700 are also possible (e.g., a tool may fit into a slot of a retaining element 700).

In certain embodiments, a membrane (or "puncture skin") 632 may at least partially cover the tool passageway 630. The membrane 632 is preferably thin enough to be punctured by the tool prior to engagement with the retaining member 700 (e.g., about 0.01 inch thick). The membrane 632 can provide evidence of tampering with the hub assembly 400. The membrane 632 may also disguise access to the retaining member 700, such that only a person having knowledge of the hub assembly 400 is able to detach the hub assembly 400 from the axle 150. Although illustrated as being in a portion of the tool passageway 630 proximate to the conduit 610, the membrane 632 may be flush with the end wall 614 or elsewhere. The tool passageway 630 may be raised with respect to the end wall 614 (e.g., by the lip 634) to identify the tool passageway 630 if covered by a membrane 632 and/or to aid in positioning of the hub assembly 400 into the wheel 202, 302. Additionally, the components of the hub assembly 400 remain together upon intentional or unintentional detachment from a wheel 202, 302, which can prevent the retaining element 700 and/or the biasing element 800 from becoming lost or damaged.

Certain hub assemblies known in the art leave the second end of the pin sleeve open, which allows the retaining member and/or the biasing element to exit the second end of the pin sleeve when the hub assembly is not coupled to a wheel. Such wheel assemblies thus require simultaneous assembly of the components of the hub assembly and attachment of the hub assembly to the wheel. Similarly, damage to the wheel assembly resulting in detachment of the hub assembly from the wheel can cause the components of the hub assembly to exit the pin sleeve, whereupon they may be lost and/or damaged. By contrast, the restraining element 900 of certain embodiments of the present invention can prevent the retaining member 700 and/or the biasing element 800 from exiting the second end 608 of the pin sleeve 604. Accordingly, the components of the hub assembly 400 may be assembled at a first point in time, and later mechanically coupled to a wheel 202, 302. This allows for more modular assembly of the wheel assemblies 200, 300. For example, a factory may produce a plurality of wheels 202, 302 one day and a plurality of hub assemblies 400 another day, and then couple the wheels 202, 302 and the hub assemblies 400 at a later time. Such flexibility allows formation of the components in various orders and based on particular supplies or demands at certain periods of time.

Because hub assemblies known in the art that leave the second end of the pin sleeve open allow the retaining member and/or the biasing element to exit the second end of the pin sleeve when the hub assembly is not coupled to a wheel, automation of the coupling of the hub assembly to a wheel is limited. By contrast, the restraining element 900 of certain embodiments of the present invention can prevent the retaining member 700 and/or the biasing element 800 from exiting the second end 608 of the pin sleeve 604. Accordingly, the hub assembly 400 will not separate into its components upon manipulation by certain automating equipment (e.g., a vibratory feeder). Moreover, the hub assembly 400 can be transported, dropped, or otherwise manipulated without requiring reassembly.

FIGS. 5A through 5D illustrate cutaway and cross-sectional views of the wheel assemblies 200, 300. In certain embodiments, a method of manufacturing the wheel assemblies 200, 300 comprises forming a wheel 202, 302, forming a retainer housing 600, positioning a retaining member 700 within the pin sleeve 604, positioning a biasing element 800 in the pin sleeve 608, occluding the second end 608 of the pin sleeve 604 (e.g., with a restraining element 900), and inserting the wheel mounting sleeve 602 into the sleeve bore 210, 310. As described above, occlusion of the second end 608 of the pin sleeve 604 prevents the retaining member 700 from exiting the second end 608 of the pin sleeve 604, even when the hub assembly 400 is not coupled to the wheel 202, 302. Accordingly, formation of the retainer housing 600, positioning the retaining member 700, positioning the biasing element 800, and occluding the second end 608 of the pin sleeve 608 may be performed before or after forming the wheel 202, 302. Coupling the hub assembly 400 and the wheel 202, 302 may be while either or both of the pieces is/are warm or cold, depending on the relative deformability of the components (e.g., due to thickness or configuration), the desired post-assembly expansion characteristics, etc. In some embodiment, the wheel 202 is deflashed prior to being coupled to the hub assembly 400.

The modularity of the hub assembly 400 described above also advantageously can allow the restraining element 900 to be separate and distinct from any portions of the wheel 202, 302 (e.g., a wall 220, 320 of the wheel 202, 302, respectively). The biasing element 800 may therefore be displaced from the wall 220, 320 by at least a space or gap 402. In certain alternative embodiments, the restraining element 900 is positioned to touch the wall 220, 320. In certain alternative embodiments, the biasing element 800 is positioned to touch the wall 220, 320 (e.g., by occluding the second end 608 of the pin sleeve 604 at a position in a middle portion of the biasing element 800).

Figure 5B:
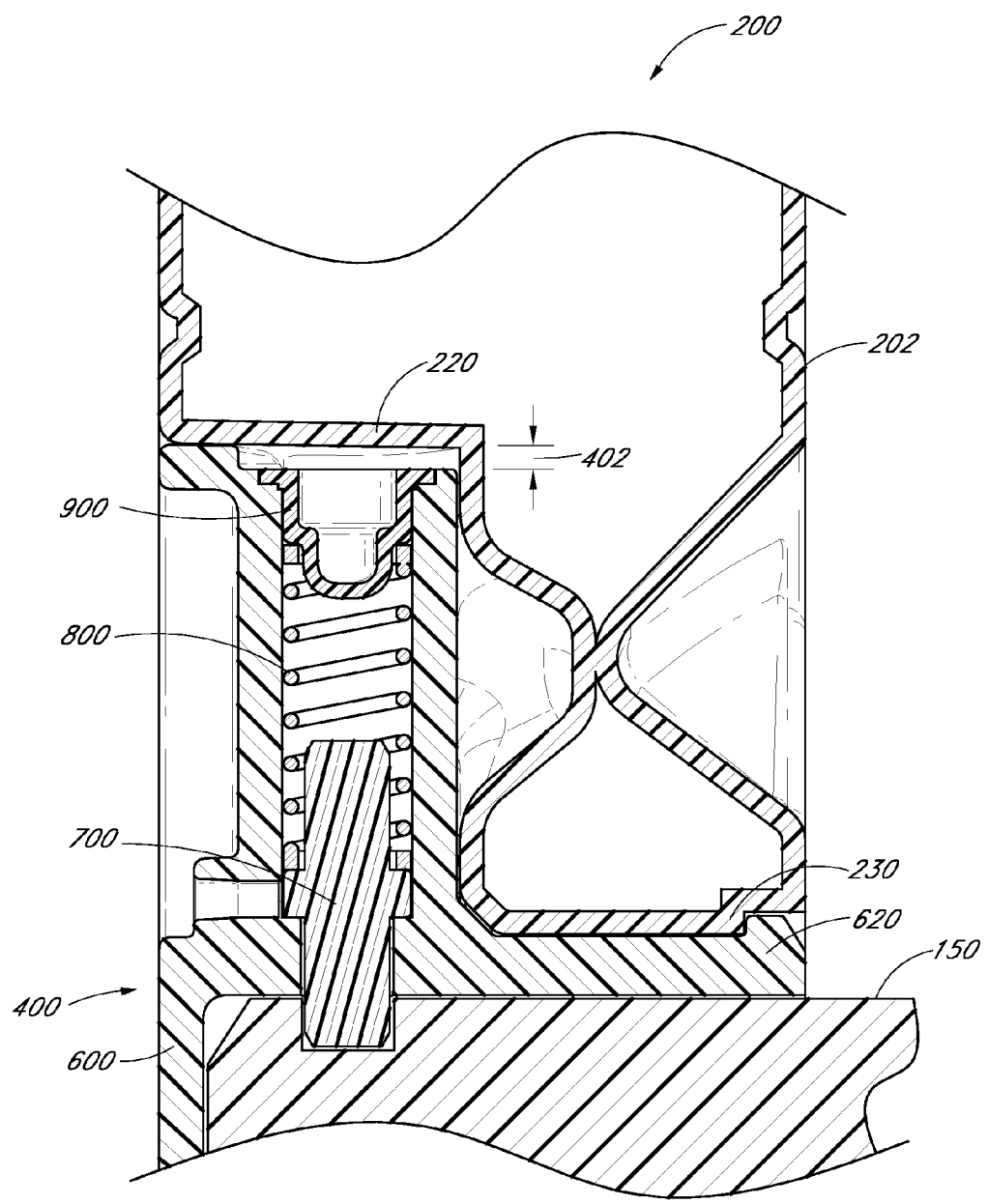
FIG. 5B is a cross-sectional view of the wheel assembly of FIG. 2A engaged with an axle.
Figure 5C:
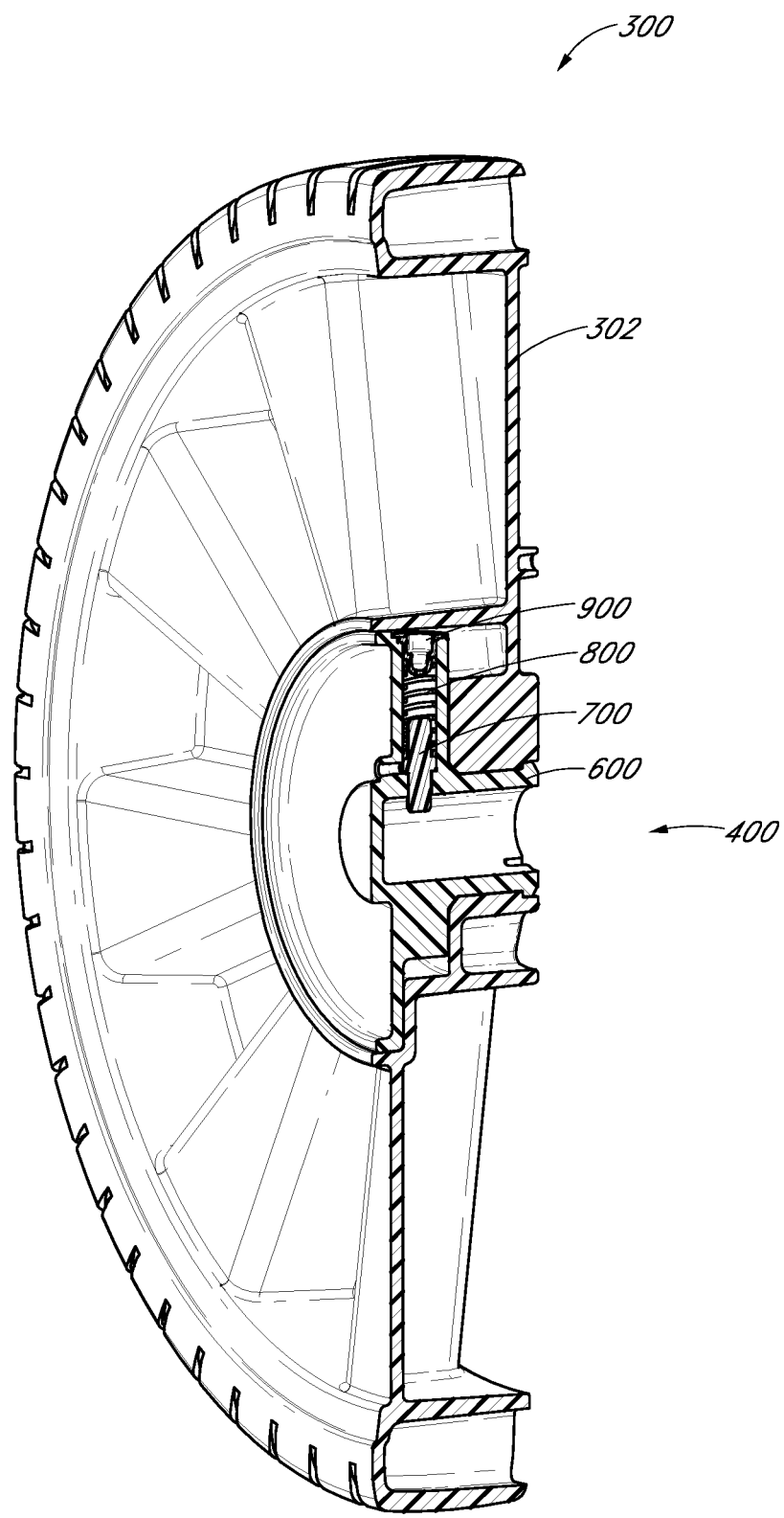
FIG. 5C is a cutaway top perspective view of the wheel assembly of FIG. 3A.
Figure 5D:
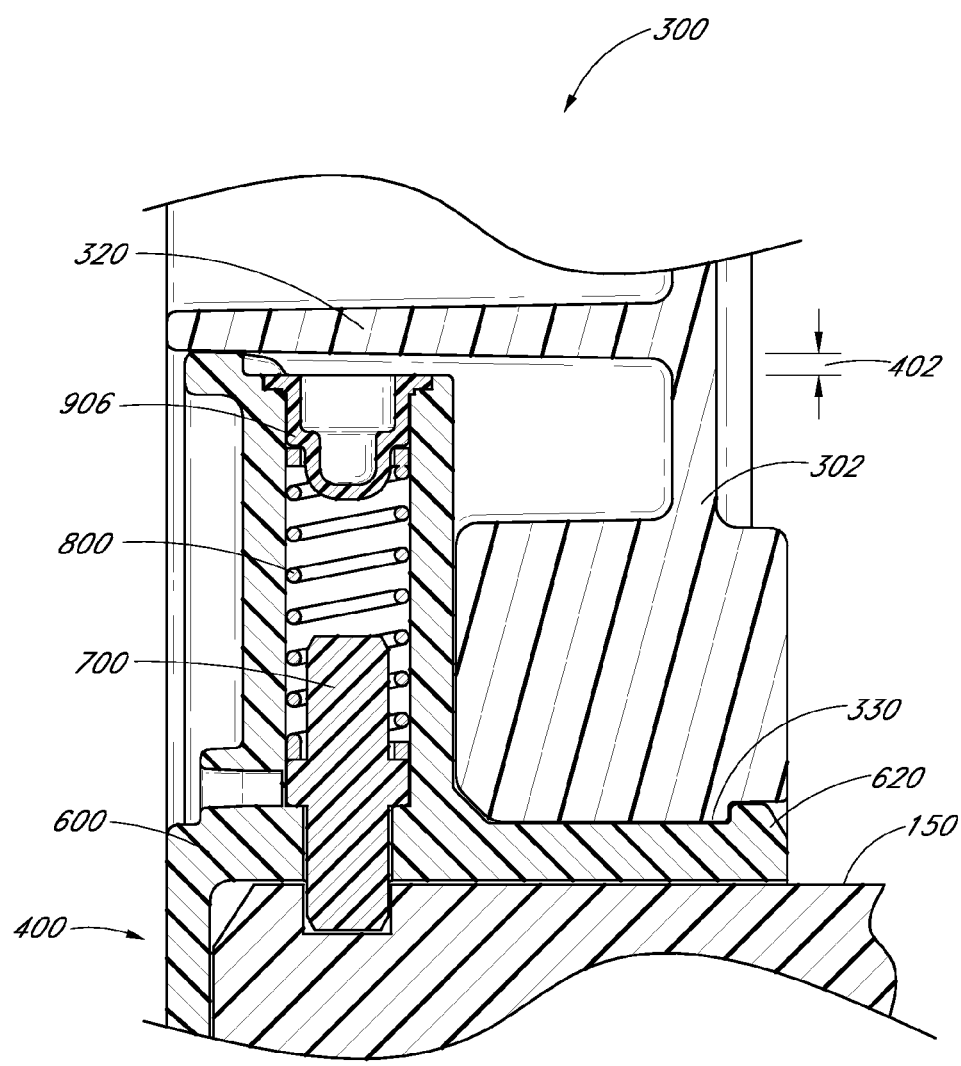
FIG. 5D is a cross-sectional view of the wheel assembly of FIG. 3A engaged with an axle.
Figure 5E:
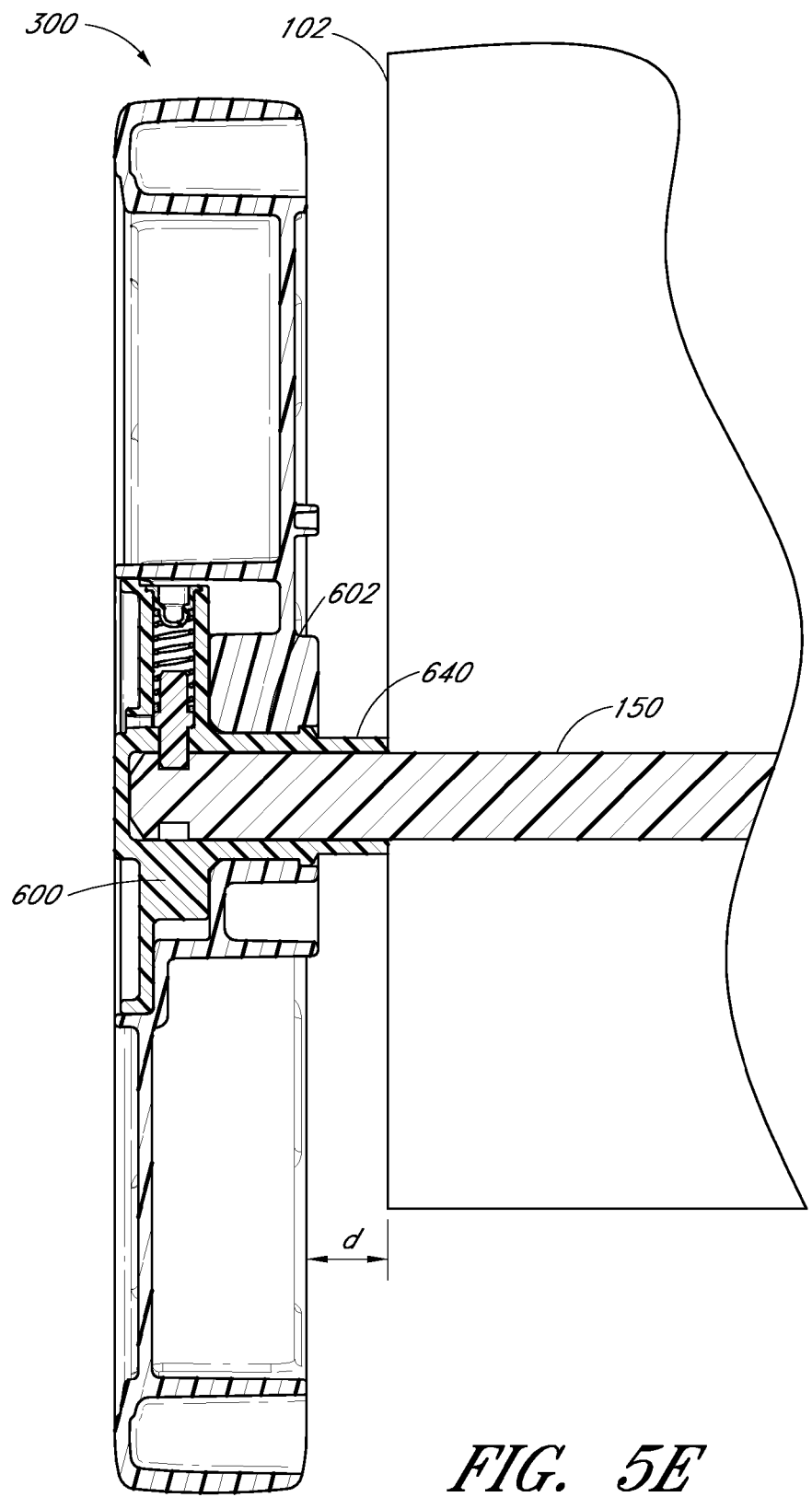
FIG. 5E is a cross-sectional view of an example embodiment of a wheel assembly engaged with an axle and a cart body.

FIG. 5E illustrates a cross-sectional view of a wheel assembly 300 engaged with an axle 150 and a cart body 102, although it will be appreciated that the wheel assembly 200 or other wheel assemblies would look similar. In certain embodiments, the inner side of the wheel assemblies 300 described herein can rub against the cart body 102. Friction from such rubbing can increase the force needed to move the refuse cart 100, can cause damage to the wheel assembly 300 and/or the cart body 102, and other problems. In some embodiments, a spacer (e.g., comprising a pipe) is placed between the wheel assembly 300 and the cart body 102 to space the wheel assembly 300 from the cart body 102 by a distance d. In certain embodiments, the retainer housing 600 comprises a spacer 640 extending from the wheel mounting sleeve 602. The spacer 640 is configured to space the wheel assembly 300 from the cart body 102 by a distance d. In certain such embodiments, the spacer 640 is integrally formed with the retainer housing 600. Such integral forming can increase the strength of the junction or interface between the spacer 640 and the wheel mounting sleeve 602 versus embodiments in which the spacer 640 is coupled (e.g., welded) to the wheel mounting sleeve 602. Integral forming can also ensure correct sizing of the spacer 640, for example to have a suitable interface with the wheel mounting sleeve 602 and/or the desired distance d from the cart body 102. Spacers can also be positioned elsewhere between the wheel assembly 300 and the cart body 102 (e.g., integrated with the wheel 302).

FIG. 6A illustrates a cross-sectional view of an example embodiment of a retainer housing 600. The retainer housing 600 includes a wheel mounting sleeve 602 and a pin sleeve 604. In certain embodiments, the wheel mounting sleeve 602 is substantially cylindrical. In some embodiments, the pin sleeve 604 is substantially cylindrical. The wheel mounting sleeve 602 includes an axle bore 606 configured to receive an axle 150 and configured to be inserted within the sleeve bore 210, 310 of a wheel 202, 302. The pin sleeve 604 includes a first end 607, a second end 608, and a conduit 610 therebetween. In certain embodiments, the conduit 610 is substantially cylindrical. When assembled, the first end 607 is in fluid communication with the axle bore 606. The first end 607 includes a shoulder 612 extending into the conduit 610. In some embodiments, the shoulder 612 may prevent the retaining member 700 from exiting the first end 607 of the pin sleeve 604 (e.g., in conjunction with a lip 704 of a retaining member 700). In the illustrated embodiment, the wheel mounting sleeve 602 is closed at one end such that an axle 150 inserted into the axle bore 606 is not visible on the outer surface of a wheel assembly 200, 300 comprising the hub assembly 400 and an axle 150.

In certain embodiments, the retainer housing 600 includes an end wall 614. The side illustrated in FIG. 6A is on the outer side of a wheel assembly 200, 300 (FIGS. 2A and 3A). In some embodiments, the end wall 614 includes text or a logo (e.g., indicative of a manufacturer of the wheel, wheel assembly, and/or hub assembly, indicative of a type of wheel and/or hub assembly, etc.). In some embodiments, the end wall 614 is shaped to appear integral with a wheel 200, 300 (e.g., including similarly shaped spokes). In some embodiments, the end wall 614 disguises the location of the pin sleeve 604. In certain embodiments, after the hub assembly 400 has been mechanically coupled to the wheel 202, 302, the end wall 614 provides substantially equal distribution of side-shifted loads because the force can be applied substantially all the way around the wheel 202, 302, as opposed to being concentrated, for example, at the junction between the wheel mounting sleeve 602 and the pin sleeve 604.

FIG. 6B illustrates the opposite side of the retainer housing 600, which illustrates that the end wall 614 may include a plurality of raised projections 616. The raised projections 616 can provide a number of advantages. In certain embodiments, the raised projections 616 may increase an amount of surface area that makes contact with the wheel 202, 302. In certain embodiments, the raised projections 616 may properly orient the retainer housing 600 with the wheel 202, 302. In some embodiments, the raised projections 616 allow the retainer housing 600 to be properly aligned (e.g., in a vibratory feeder) for assembly (e.g., automated assembly) with other components of the hub assembly 400. In certain such embodiments, at least some of the plurality of projections 616 may have a common endpoint (e.g., as illustrated by the dotted line 618).

In some embodiments, the raised projections 616 allow the hub assembly 400 to be properly aligned (e.g., in a vibratory feeder) for assembly (e.g., automated assembly) with other components of the wheel assembly 200, 300 (e.g., the wheel 202, 302). In certain such embodiments, the assembled hub assembly 400 and the wheel 202, 302 may be automatically assembled (e.g., substantially without human interaction). In some embodiments, the raised projections 616 reinforce a junction or interface between the end wall 614 and the wheel mounting sleeve, which can enhance the distribution of loads (e.g., transverse torque caused by movement of the wheel assembly 110 generally along the longitudinal axis of the axle 150).

In certain embodiments, the retainer housing 600 is injection molded. Injection molding may allow high stricter tolerances than blow molding because the thicknesses of the components may be controlled based on the spacing between the male and female molds. In some embodiments, the end wall 614, the wheel mounting sleeve 602, and the pin sleeve 604 are integrally formed, although the pieces may also be separately formed and coupled (e.g., welded). In certain such embodiments in which the elements are integrally formed, injection molding can increase throughput by reducing the number of downstream steps (e.g., eliminating trimming steps because the bores 604, 606 may be formed open at both ends). Other features of the retainer housing 600 may also be integrally formed (e.g., the raised projections 616). In certain embodiments, the retainer housing 600 comprises plastic (e.g., high density polyethylene (HDPE) (e.g., high molecular weight HDPE)).

In some embodiments, the wheel mounting sleeve 602 comprises an annular rib 620 configured to engage a sidewall 230, 330 of a wheel 202, 302, respectively (FIGS. 5B and 5D). The rib 316 has a width that is wider than the width of the sleeve bore 402. In certain embodiments, the wheel mounting sleeve 602 is press-fit into the sleeve bore 210, 310 of a wheel 202, 302 until the annular rib 620 resiliently snaps out from the sleeve bore 210, 310. In certain such embodiments, the wheel mounting sleeve 602 does not comprise slots. In certain alternative embodiments, the the annular rib 620 comprises at least one axial slot 622 that can facilitate passage of the annular rib 620 through the sleeve bore 210, 310. The at least one axial slot 622 can also extend into the wheel mounting sleeve 602, although there may be a tradeoff between the flexibility and strength of and the wheel mounting sleeve 602. In certain embodiments, the annular rib 620 comprises two axial slots 622 and a tooth 624 between the axial slots 622. In a relaxed position, the tooth 624 has a width that is wider than the sleeve bore 210, 310. The axial slots 622 thus can assist in radially inward flexing of the tooth 624 as it is urged through the sleeve bore 210, 310.

FIG. 7 illustrates an example embodiment of a retaining member 700. In some embodiments, the retaining member 700 comprises a pin. The retaining member 700 is configured to operatively engage a groove 152 in an axle 150. In certain embodiments, an axle 150 has a chamfered end such that the retaining member 700 is transversely displaced relative to the movement of the axle 150. In certain alternative embodiments, the retaining member 700 is shaped (e.g., chamfered) such that it is transversely displaced relative to the movement of an axle 150 (e.g., without a chamfered end). In some embodiments, the retaining member 700 is configured (e.g., dimensioned) to reduce (e.g., decrease, minimize, prevent) rubbing of the sides of the groove 152 in the axle 150 by the sides of the retaining member 700.

In some embodiments, the retaining member 700 comprises metal (e.g., stainless steel), which is may be more resistant to damage from typical usage of the wheel assembly 200, 300 than plastic. Metal may also be better suited to shock loading and vibration than plastic. However, other materials (e.g., plastic) are also possible. In some embodiments, the retaining member 700 includes a central body 702 and a lip 704 extending outwardly from the central body 702. In certain such embodiments, the lip 704 is wider than the shoulder 612 of the first end 607 of the pin sleeve 604 and narrower than the conduit 610, and is longitudinally positioned along the central body 702 such that only a portion of the retaining member 700 extends into the axle bore 606. The shoulder 612 may prevent the retaining member 700 from exiting the first end 607 of the pin sleeve 604 by interacting with the lip 704 in such embodiments. Other shapes and types of retaining members 700 are also possible. For example, the retaining member 700 may be shaped to always have a certain orientation within the conduit 610 (e.g., having a flat side 750 that prevents rotation of the retaining member 700 within the conduit 610, as illustrated in FIG. 7B). Such an embodiment may be useful for proper engagement of a chamfered retaining member 700, as illustrated by the portion 752 in FIG. 7, with a non-chamfered axle 150. For another example, the lip 704 may be longitudinally thicker, which can stabilize the retaining member 700, as illustrated in FIG. 7A, by reducing the chance of the retaining member 700 pivoting within the conduit 610. Other possible shapes include those that aid in engaging the retaining member 700 with the biasing element 800.

FIG. 8 illustrates an example embodiment of a biasing element 800. The biasing element 800 is configured to bias the retaining member 700 towards the axle bore 606. In some embodiments, the biasing element 800 comprises a spring. In some embodiments in which the biasing element 800 comprises a spring, a first end 802 mechanically engages the lip 704 of the retaining member 700 and the second end 804 mechanically engages the shoulder 902 of the restraining element 900 to bias the retaining member 700 towards the axle bore 606. In some embodiments, the biasing element 800 comprises metal (e.g., stainless steel), which is may be more resistant to damage from typical usage of the wheel assembly 200, 300 than plastic and which may be better suited to shock loading and vibration than plastic. However, other materials (e.g., plastic) are also possible. Other shapes and types of biasing elements 800 are also possible. In certain embodiments, the retaining member 700 and the biasing element 800 are disposed in a cartridge that can be disposed in the pin sleeve 604. However, it will be appreciated that adding non-essential layers such as the cartridge body would not depart from the invention disclosed herein.

Figure 9A:
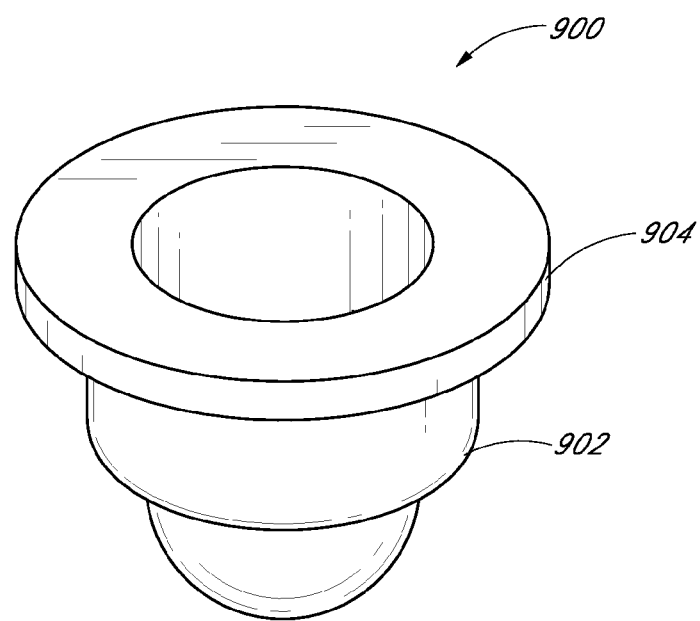
FIG. 9A is a top perspective view of an example embodiment of a restraining element.
Figure 9B:
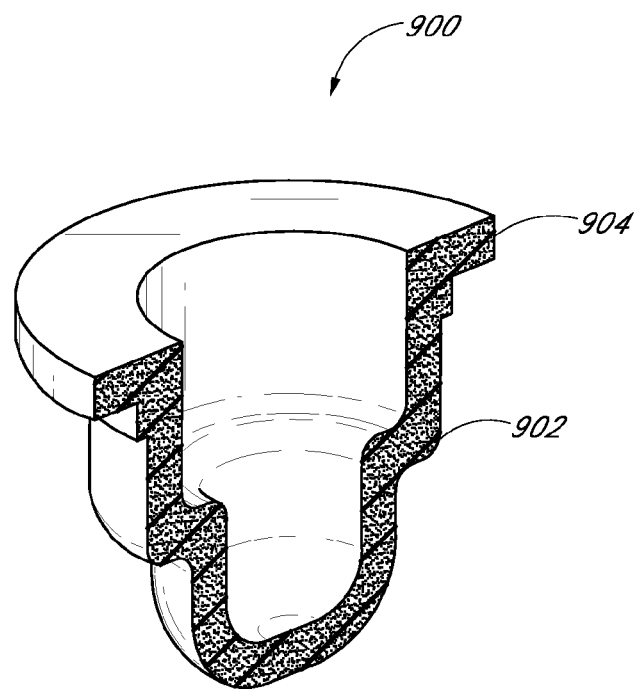
FIG. 9B is a cross-sectional view of the restraining element of FIG. 9A.

FIGS. 9A and 9B illustrate an example embodiment of a restraining element 900. The restraining element 900 is configured to prevent the retaining member 700 from exiting the second end 608 of the pin sleeve 604. In some embodiments, the restraining element 900 comprises a plug (e.g., as illustrated in FIGS. 4A-5D). In some embodiments in which the restraining element 900 comprises a plug, the plug is mechanically coupled to the second end 608 of the pin sleeve 604. The illustrated plug 900 comprises a shoulder 902 and a lip 904. The shoulder 902 is configured to mechanically engage the second end 804 of a biasing element 800. The lip 904 is configured to mechanically engage the pin sleeve 604. After the retaining member 700 and the biasing element 800 are disposed in the pin sleeve 604, the plug 900 may be welded (e.g., heat welded, ultrasonic welded) or otherwise affixed (e.g., adhered, mechanically forced, etc.) to the pin sleeve 604. In some embodiments, the retaining element 900 comprises molded (e.g., blow molded or injection molded) plastic, although other materials are also possible. Other shapes and types of restraining elements 900 are also possible. For example, the restraining element 900 may be mechanically coupled (e.g., welded) to the biasing element 800 prior to assembly in the hub assembly 400. FIGS. 10A-10D illustrate further example embodiments of hub assemblies comprising different types of restraining elements 900.

Figure 10A:
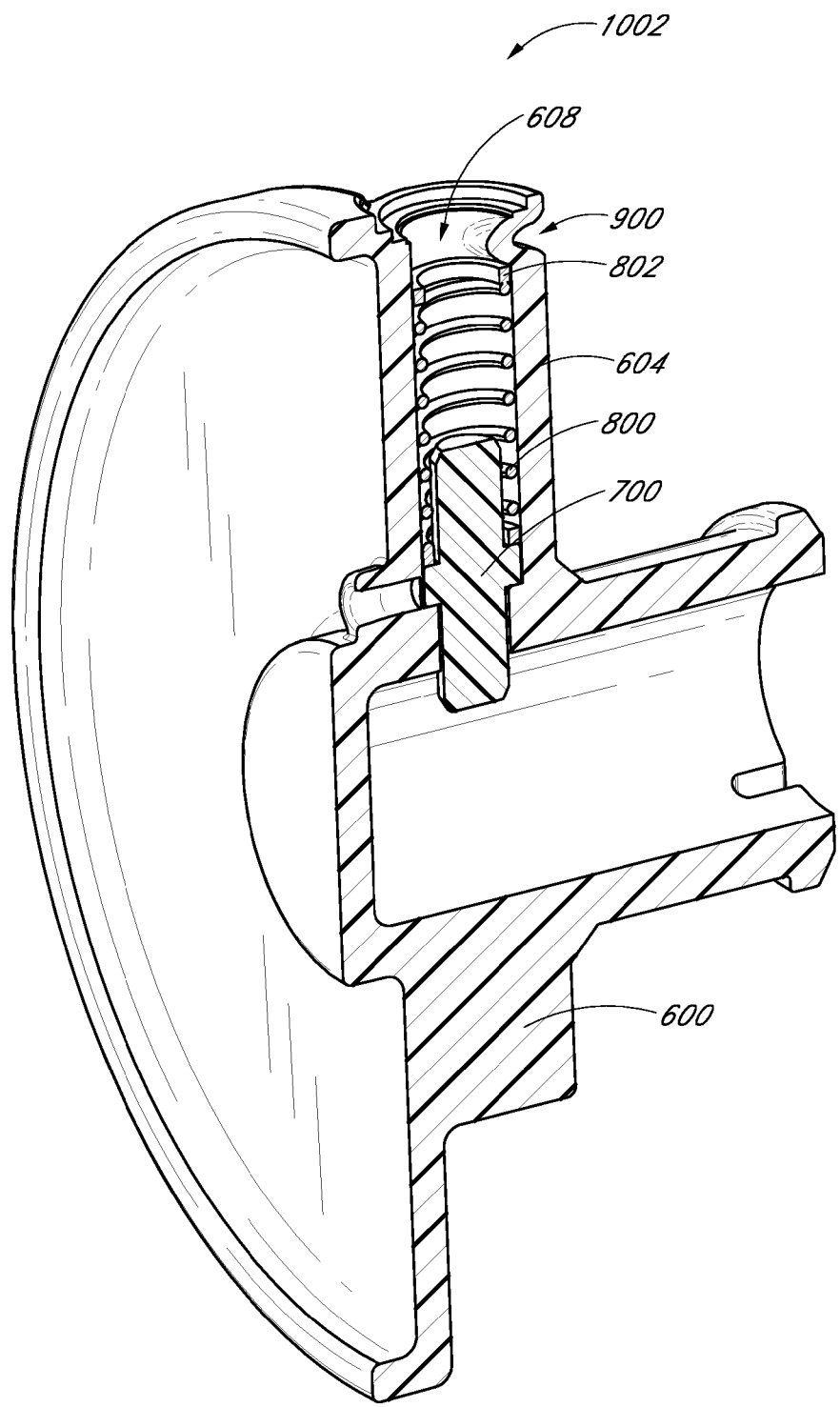
FIG. 10A is a top perspective cross-sectional view of another example embodiment of a hub assembly.

FIG. 10A illustrates an embodiment of a hub assembly 1002 in which the restraining element 900 comprises an indentation in the second end 608 of the pin sleeve 604. After the retaining member 700 and the biasing element 800 are disposed in the pin sleeve 604, the second end 608 of the pin sleeve 604 is deformed (e.g., heat deformed). The deformation 900 is configured to prevent the retaining member 700 from exiting the second end 608 of the pin sleeve 604 (e.g., by being narrower than the biasing element 800 such that the second end 804 of the biasing element 800 is mechanically engaged therewith). The deformation may be all around the pin sleeve 604, in a single location, in a plurality of locations, etc.

Figure 10B:
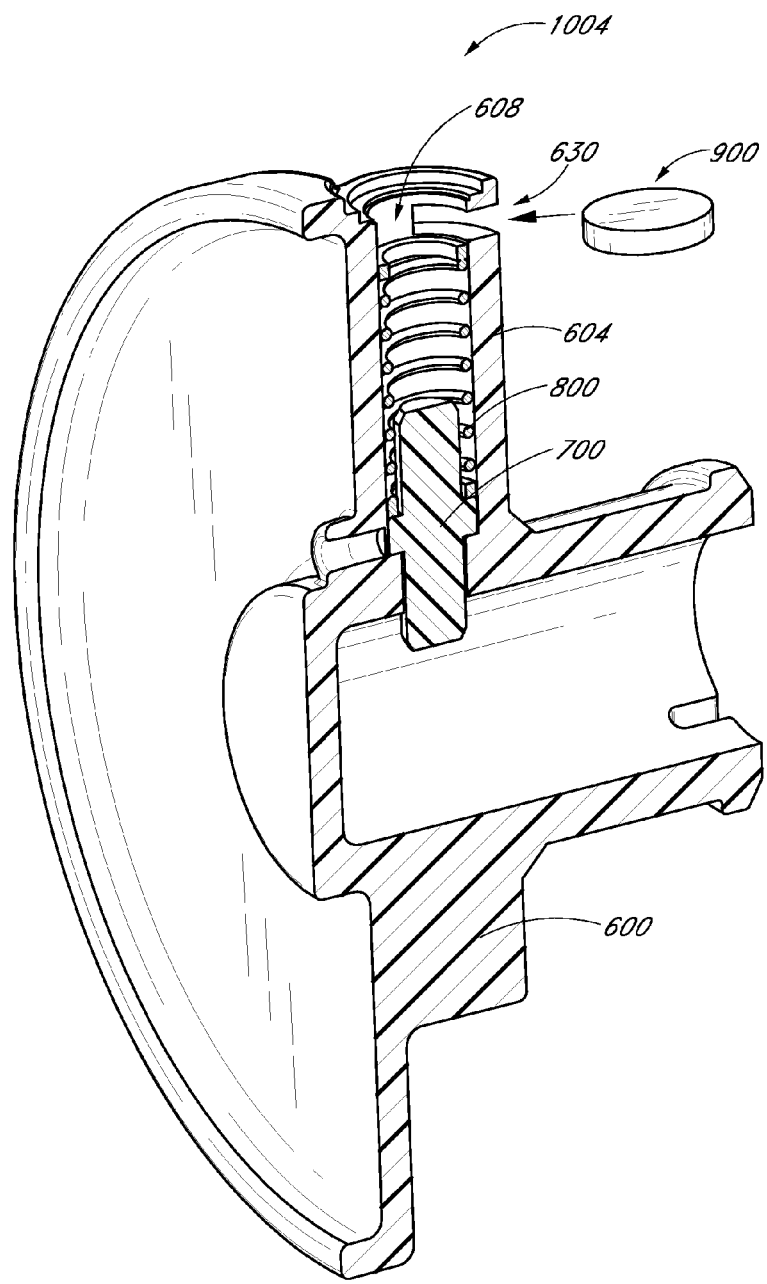
FIG. 10B is a top perspective cross-sectional view of still another example embodiment of a hub assembly.

FIG. 10B illustrates an embodiment of a hub assembly 1004 in which the restraining element 900 comprises a disc configured to be inserted proximate to the second end 608 of the pin sleeve 604. After the retaining member 700 and the biasing element 800 are disposed in the pin sleeve 604, the disc 900 is inserted (e.g., into a pin sleeve window 630). The disc 900 may be welded (e.g., heat welded, ultrasonic welded) or otherwise affixed (e.g., adhered, mechanically forced, etc.) to the pin sleeve 604. The disc 900 is configured to prevent the retaining member 700 from exiting the second end 608 of the pin sleeve 604 (e.g., by blocking the second end 608 of the pin sleeve 604 such that the second end 804 of the biasing element 800 is mechanically engaged therewith).

Figure 10C:
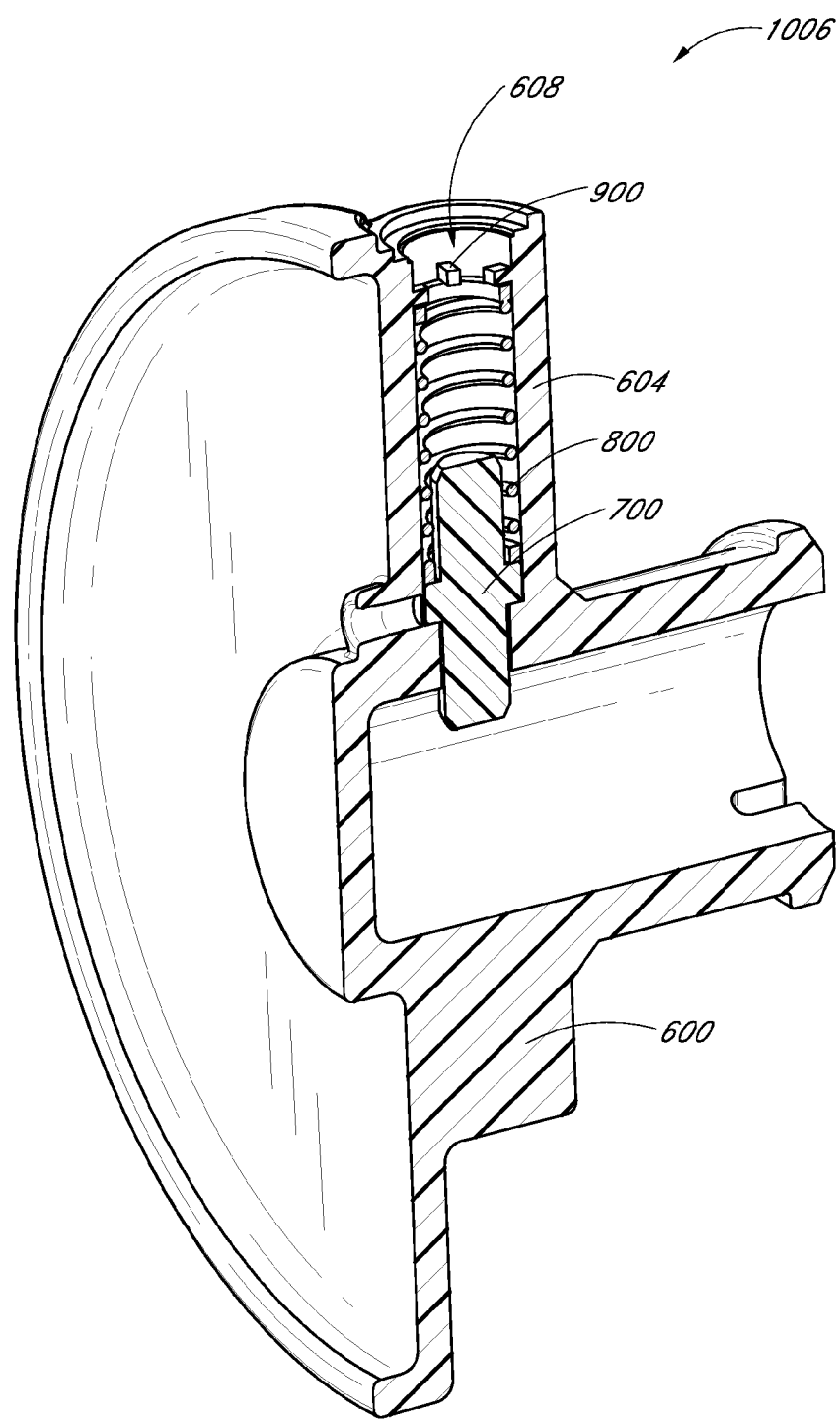
FIG. 10C is a top perspective cross-sectional view of yet another example embodiment of a hub assembly.

FIG. 10C illustrates an embodiment of a hub assembly 1006 in which the restraining element 900 comprises a plurality of ledges 900 extending into the pin bore 610. The ledges 900 may be formed before or after the retaining member 700 and biasing element 800 are disposed in the pin sleeve 604. For example, if formed before (e.g., by being integrally molded with the retainer housing 600, as illustrated in FIG. 10C), they may be pliable to the insertion of the retaining member 700 and biasing element 800, but rigid against the removal of the retaining member 700 and biasing element 800. The ledges 900 are configured to prevent the retaining member 700 from exiting the second end 608 of the pin sleeve (e.g., by extending into the pin bore 610 wider than the biasing element 800 such that the second end 804 of the biasing element 800 is mechanically engaged therewith).

Figure 10D:
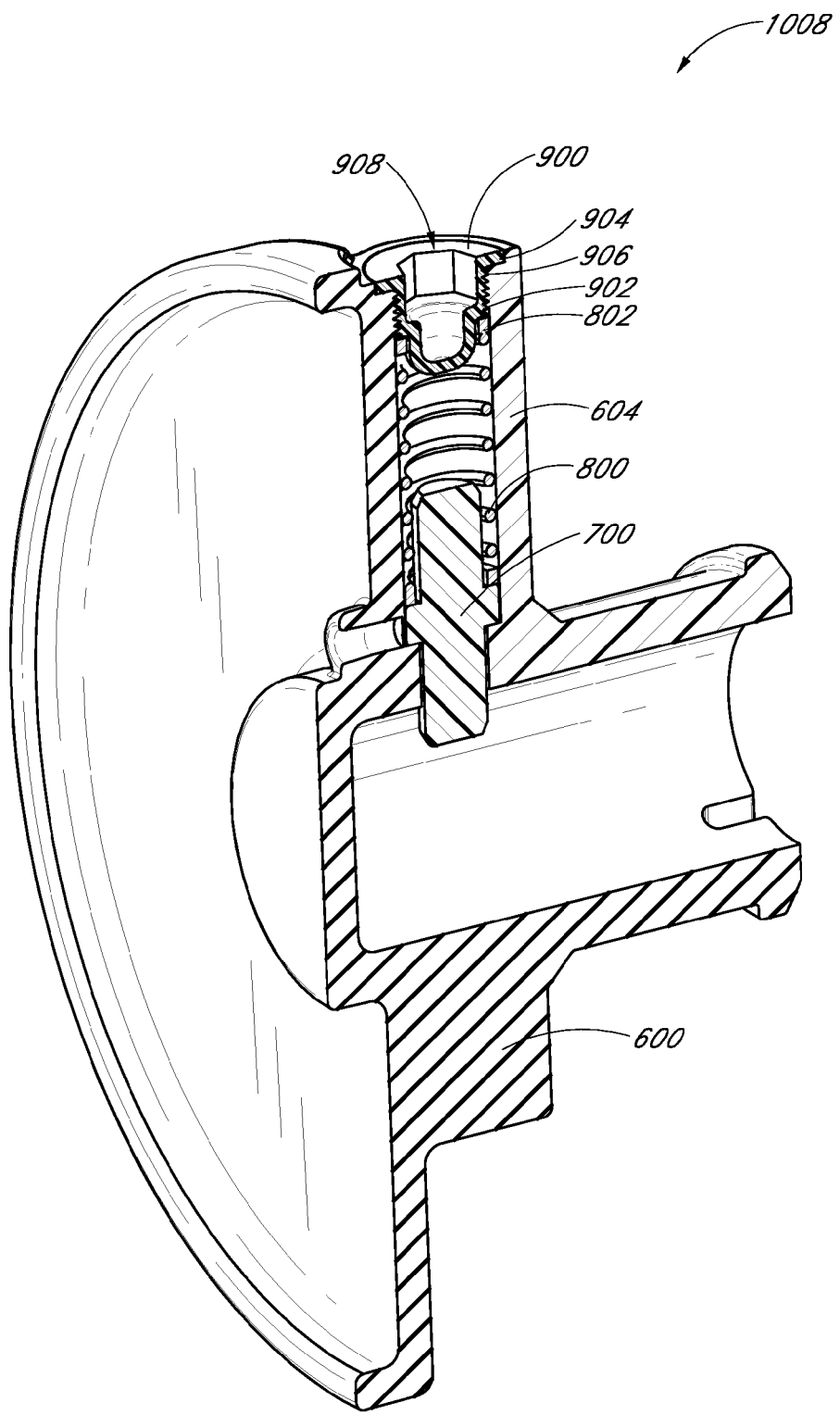
FIG. 10D is a top perspective cross-sectional view of yet still another example embodiment of a hub assembly.

FIG. 10D illustrates an embodiment of a hub assembly 1008 in which the restraining element 900 comprises a plug 900 including threads 906. In such an embodiment, the second end 608 of the pin sleeve 604 may also comprise threads (e.g., complementary threads). As described above with respect to the plug 900 of FIGS. 9A and 9B, the plug 900 comprises a shoulder 902 configured to mechanically engage the second end 804 of the biasing element 800 and a lip 904 configured to mechanically engage the second end 608 of the pin sleeve 604. After the retaining member 700 and the biasing element 800 are disposed in the pin sleeve 604, the plug 900 is threaded into the pin sleeve 604. In certain embodiments, the plug 900 comprises a fastening device 908 (e.g., a hexagonal hole as illustrated in FIG. 10D, a screwdriver slot, etc.) in which transverse force on the plug 900 causes it to be screwed into the pin sleeve 604. It will be appreciated that the restraining elements 900 illustrated herein are for example purposes only, and that a variety of other restraining elements are also possible.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A hub assembly comprising:
    a retainer housing including:
        a wheel mounting sleeve including an axle bore configured to receive an axle; and
        a pin sleeve having a first end and a second end and including a conduit between the first end and the second end, the first end in fluid communication with the axle bore;
    a retaining member in the conduit, the retaining member configured to engage a groove in an axle;
    a biasing element in the conduit, the biasing element configured to bias the retaining member towards the axle bore; and
    an occlusion proximate to the second end of the pin sleeve, the occlusion configured to inhibit the retaining member from exiting the conduit at least prior to coupling the hub assembly to a wheel.

2. The hub assembly of claim 1, wherein the occlusion comprises a deformation.

3. The hub assembly of claim 2, wherein the deformation comprises an indentation in a side of the pin sleeve.

4. The hub assembly of claim 2, wherein the deformation comprises a heat deformation.

5. The hub assembly of claim 1, wherein the occlusion comprises a plurality of ledges extending into the conduit.

6. The hub assembly of claim 5, wherein the plurality of ledges comprises four ledges.

7. The hub assembly of claim 6, wherein the four ledges are spaced by about 90° around a circumference of the pin sleeve.

8. The hub assembly of claim 1, wherein the biasing element abuts the occlusion.

9. The hub assembly of claim 1, wherein the occlusion is formed during forming the retainer housing.

10. The hub assembly of claim 1, wherein the occlusion is formed after forming the retainer housing.

11. The hub assembly of claim 1, wherein the occlusion is longitudinally spaced from the second end of the pin sleeve.

12. The hub assembly of claim 1, wherein the first end of the pin sleeve includes a shoulder and wherein the retaining member comprises a lip wider than the shoulder.

13. The hub assembly of claim 12, wherein the biasing element abuts the lip.

14. The hub assembly of claim 1, wherein the retaining member comprises metal, the biasing element comprises metal, and the retainer housing comprises plastic.

15. The hub assembly of claim 1, wherein the retaining member is shaped to have one rotational orientation within the conduit.

16. The hub assembly of claim 1, wherein the retaining member is configured to move longitudinally within the conduit of the pin sleeve upon movement of an axle into the axle bore.

17. The hub assembly of claim 1, further comprising a spacer extending from the wheel mounting sleeve.

18. A wheel assembly comprising:
    a wheel; and
    the hub assembly of claim 1 coupled to the wheel.

* * * * *

UNITED STATES PATENT AND TRADEMARK OFFICE
CERTIFICATE OF CORRECTION

| | | |
|---|---|---|
| PATENT NO. | : 8,616,658 B2 | Page 1 of 1 |
| APPLICATION NO. | : 13/673655 | |
| DATED | : December 31, 2013 | |
| INVENTOR(S) | : Morris | |

It is certified that error appears in the above-identified patent and that said Letters Patent is hereby corrected as shown below:

In the Claims:

In column 13 at line 31, In Claim 1, change "an" to --the--.

Signed and Sealed this
Fifth Day of August, 2014

Michelle K. Lee
*Deputy Director of the United States Patent and Trademark Office*